(12) United States Patent
Bishop et al.

(10) Patent No.: US 12,498,326 B2
(45) Date of Patent: Dec. 16, 2025

(54) AUTO FOCUS SYSTEM FOR INSPECTION OF HIGH-DENSITY PARTS

(71) Applicant: Velocity Image Processing LLC, Needham, MA (US)

(72) Inventors: Robert P. Bishop, Tiverton, RI (US); Timothy Pinkney, Naples, FL (US)

(73) Assignee: Velocity Image Processing LLC, Tiverton, RI (US)

(*) Notice: Subject to any disclaimer, the term of this patent is extended or adjusted under 35 U.S.C. 154(b) by 23 days.

(21) Appl. No.: 18/135,764

(22) Filed: Apr. 18, 2023

(65) Prior Publication Data

US 2023/0366823 A1   Nov. 16, 2023

Related U.S. Application Data

(60) Provisional application No. 63/332,293, filed on Apr. 19, 2022.

(51) Int. Cl.
| | | |
|---|---|---|
| G01N 21/64 | (2006.01) | |
| G06T 7/521 | (2017.01) | |
| G06T 7/70 | (2017.01) | |
| H04N 23/67 | (2023.01) | |

(52) U.S. Cl.
CPC ....... G01N 21/6489 (2013.01); G01N 21/645 (2013.01); G06T 7/521 (2017.01); G06T 7/70 (2017.01); H04N 23/671 (2023.01); *G06T 2207/10064* (2013.01); *G06T 2207/30148* (2013.01)

(58) Field of Classification Search
CPC . G06T 7/521; G06T 7/70; G06T 2207/10064; G06T 2207/30148; H04N 23/671
See application file for complete search history.

(56) References Cited

U.S. PATENT DOCUMENTS

| | | |
|---|---|---|
| 2003/0039388 A1 | 2/2003 | Urlich et al. |
| 2003/0053676 A1 | 3/2003 | Shimoda et al. |
| 2005/0167568 A1* | 8/2005 | Amar ............ G01N 21/9501 250/201.2 |
| 2007/0090189 A1 | 4/2007 | Suwa et al. |
| 2010/0195114 A1 | 8/2010 | Mitsumoto et al. |
| 2011/0001818 A1 | 1/2011 | Hur et al. |

(Continued)

OTHER PUBLICATIONS

International Search Report and Written Opinion Dated Oct. 26, 2023 for Related PCT/US23/18885.

(Continued)

*Primary Examiner* — Rowina J Cattungal
(74) *Attorney, Agent, or Firm* — David J. Thibodeau, Jr.; VLP Law Group LLP

(57) ABSTRACT

A method and apparatus to maintain image focus on parts such as wafers, circuit boards, or high-density substrates as the part is being inspected. Focus performance is independent of feature and trace orientation and density. This apparatus can be easily integrated into an inspection system and can maintain focus on parts with high aspect ratio structures and or low or non-reflective insulators. It enables the inspection of high-density fine line products requiring the use of high resolution, high numerical aperture (NA) imaging optics with small depths of focus (DOF) that must be kept in focus during the inspection.

17 Claims, 33 Drawing Sheets

First And Second Pattern Simultaneously Projected Onto A Part

(56) References Cited

U.S. PATENT DOCUMENTS

| | | | |
|---|---|---|---|
| 2014/0168404 A1* | 6/2014 | Westphal | G02B 21/245 |
| | | | 348/79 |
| 2016/0028936 A1* | 1/2016 | Saphier | G02B 7/32 |
| | | | 348/87 |
| 2017/0032507 A1 | 2/2017 | Otaki et al. | |
| 2018/0001611 A1* | 1/2018 | Lingier | B05C 11/1005 |
| 2019/0195621 A1* | 6/2019 | Ogawa | G01B 11/25 |

OTHER PUBLICATIONS

Wang et al., Developments and Applications of Moire Techniques for Deformation Measurement, Structure Characterization and Shape Analysis, Recent Patents on Materials Science, vol. 8(3), pp. 188-207 (2015).

* cited by examiner

PRIOR ART
From Figure 12A in US 9113091

PRIOR ART
Focus camera viewing projected focus line from Figure 13 in US 9113091

Focus Line Projected Onto A Part At Different Heights

Side View Of Projected Focus Line

Cross Section of In-Focus Line
Showing Location Of Centroid

Cross Section Of Out-Of-Focus
Line Showing Location Of Centroid

Measurement Errors At Transitions Between Reflective Traces And A Very Low Or Non-Reflective Insulator Focus Depth For High NA Optics First Pattern Projected Onto A Part First Pattern Projected Onto A Part Second Pattern Projected Onto A Part Second Pattern Projected Onto A Part First And Second Pattern Simultaneously Projected Onto A Part First And Second Pattern Simultaneously Projected Onto A Part

Pattern Images As Seen On Surface Of Focus Camera

Part Above Focus

Part In Focus

Part Below Focus

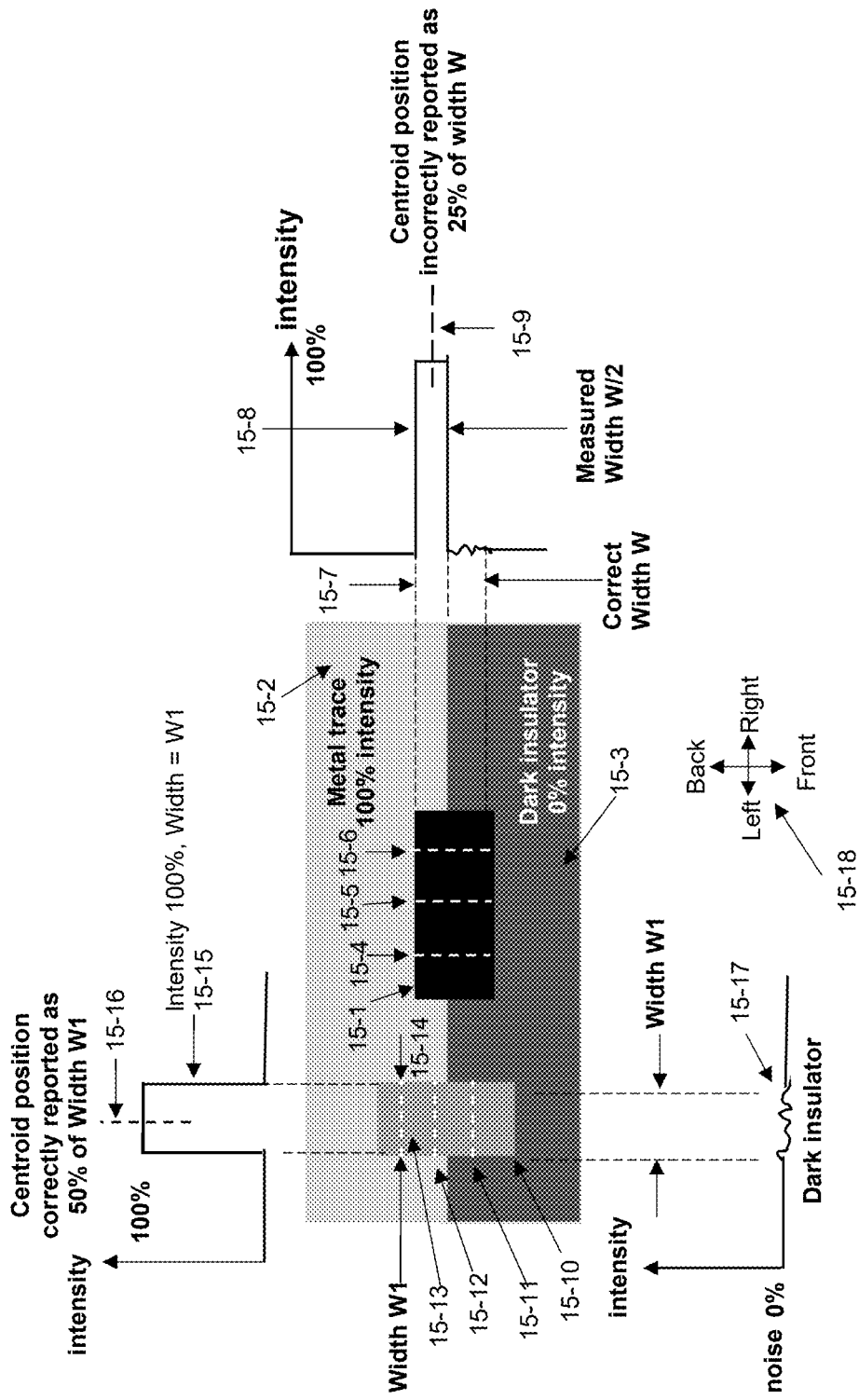

Rules For Determining If A Slice Measurement Is Valid

Valid Slice Measurements Used To Calculate Focus Height

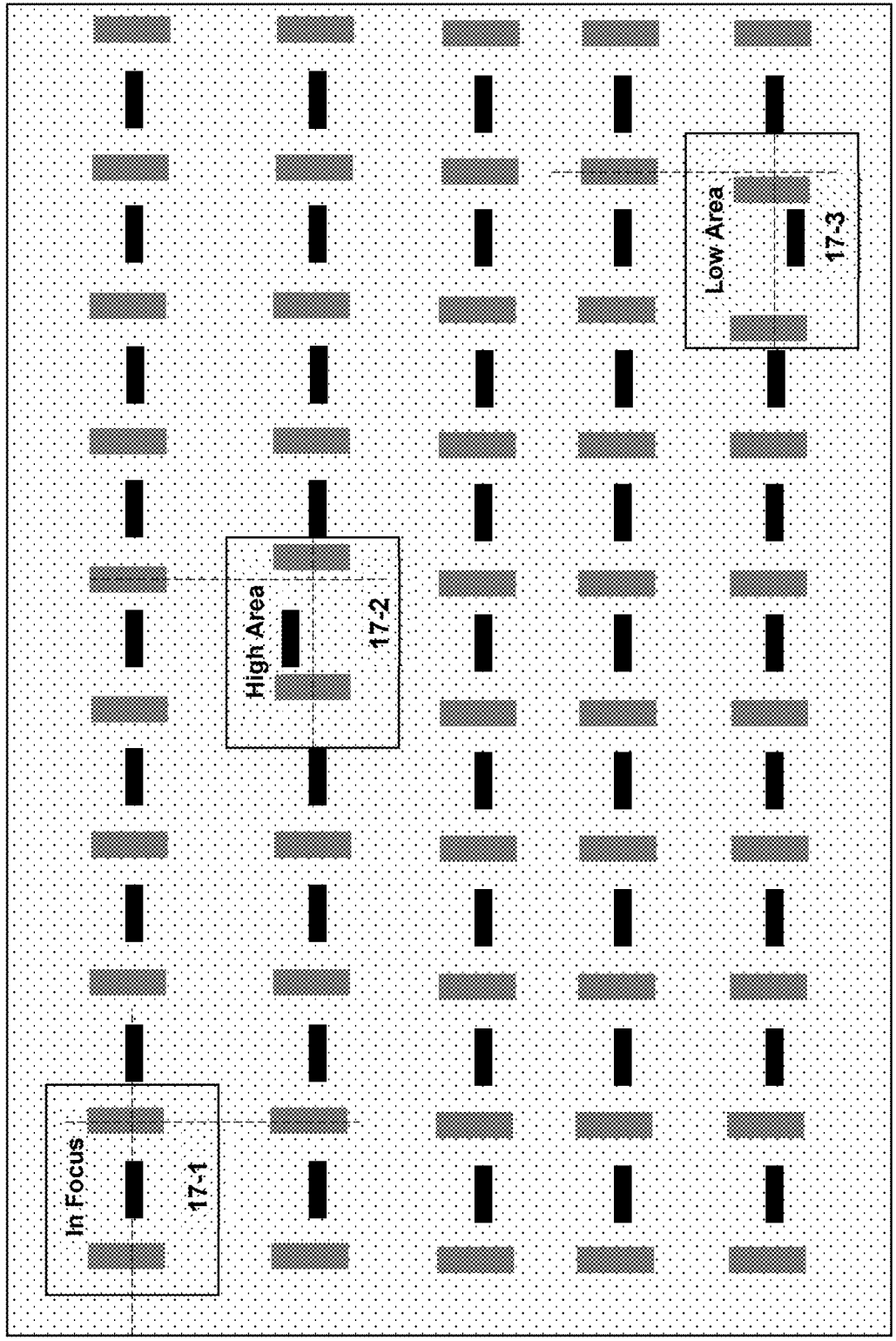

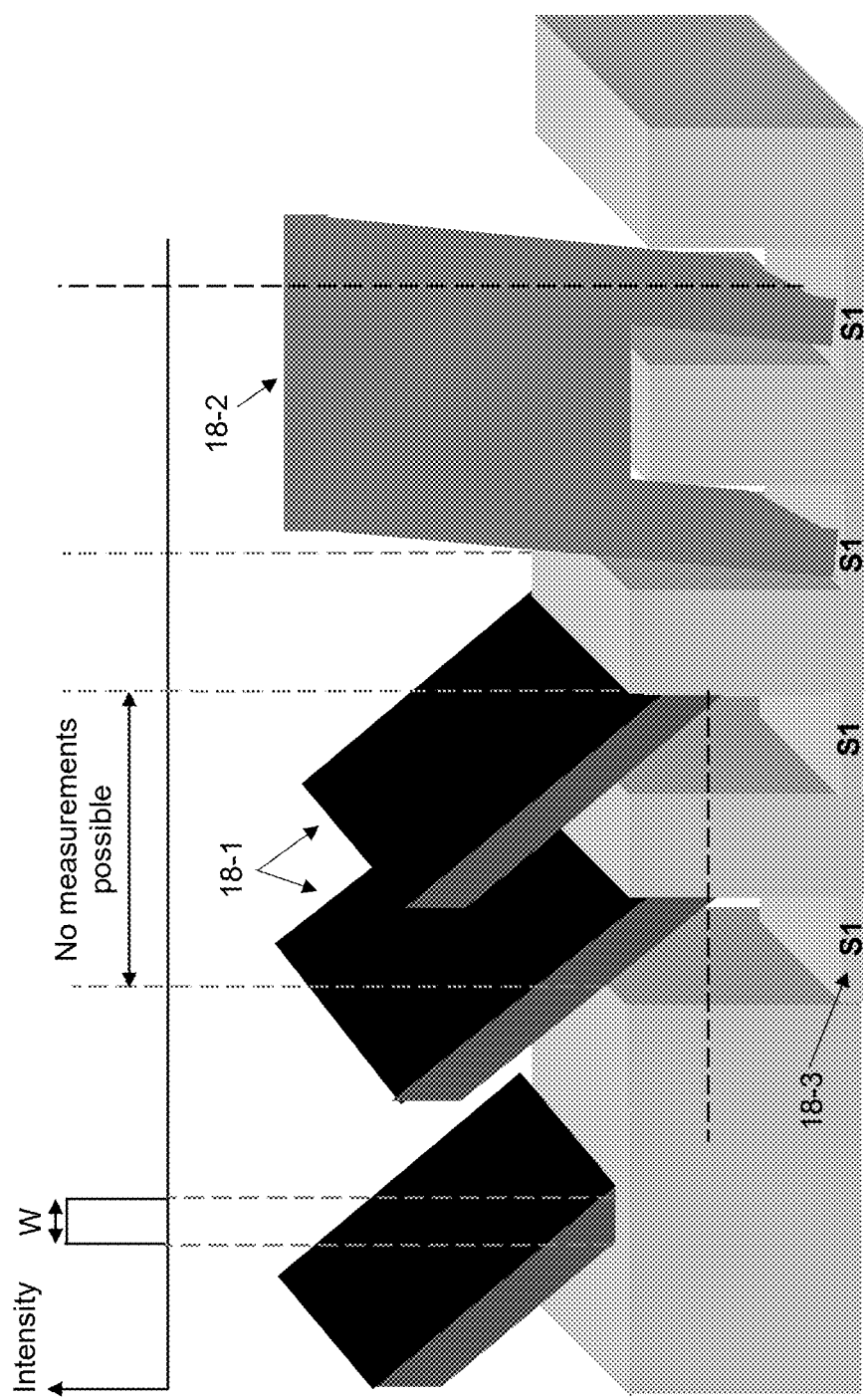

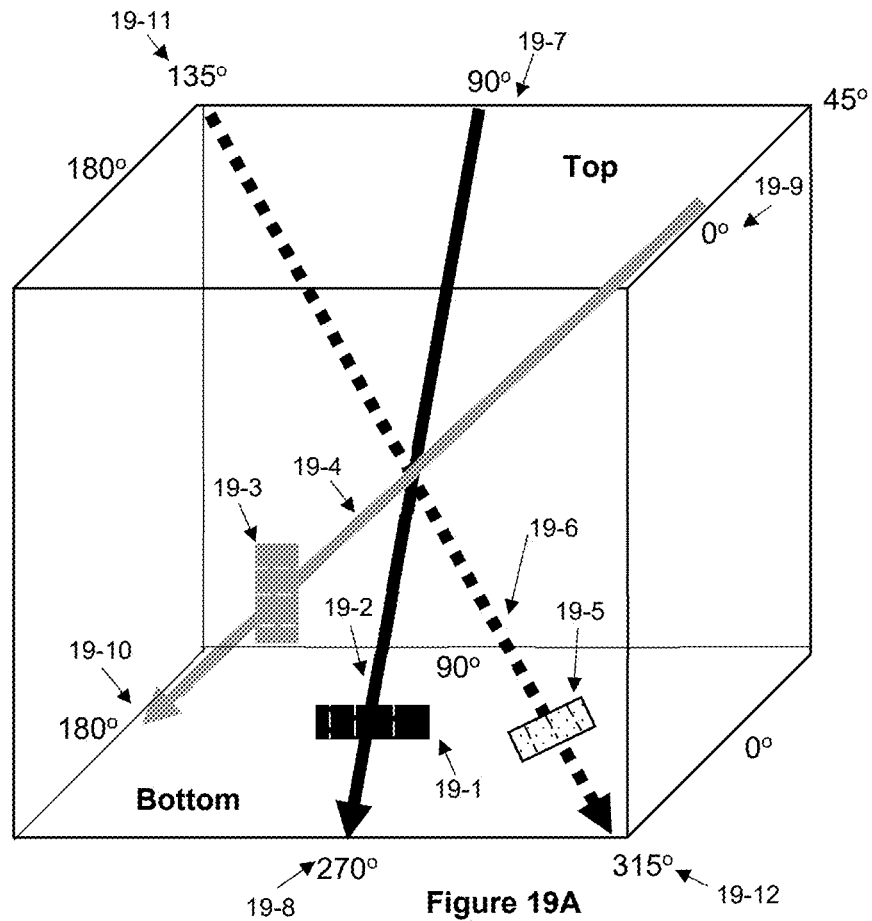
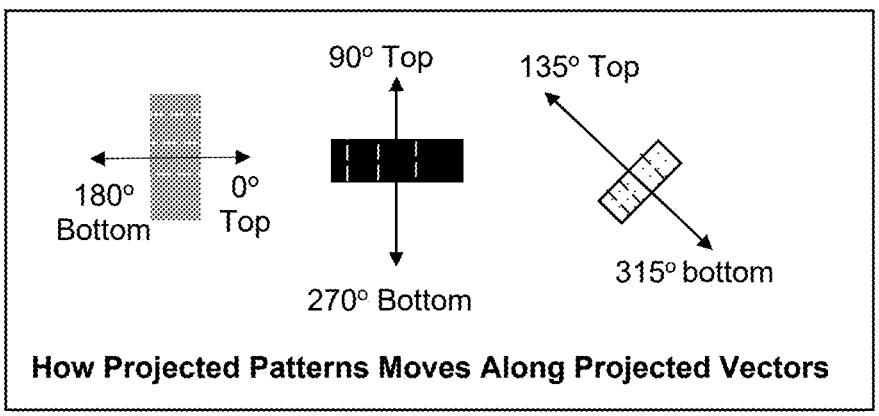
Figure 19B

How Projected Patterns Move Along Projected Vectors As A Function Of Height

How Projected Patterns Moves Along Projected Vectors As A Function Of Height

Three Patterns Projected Onto A Part With Multiple Copies Of Each Shape

How A Projected Pattern Moves On The Focus
Camera As A Function Of Focus Height

How Projected Pattern Moves On Focus Camera

How Projected Pattern Moves Along Projected Vector
As A Function Of Height

Fitting Reference Shape To Altered Shape On Focus Camera

Two Projected Focus Patterns For Opposite Directions Of Scan

Inspection Camera Scan Pattern

Two Patterns On Focus Camera For Scanning In Opposite Directions

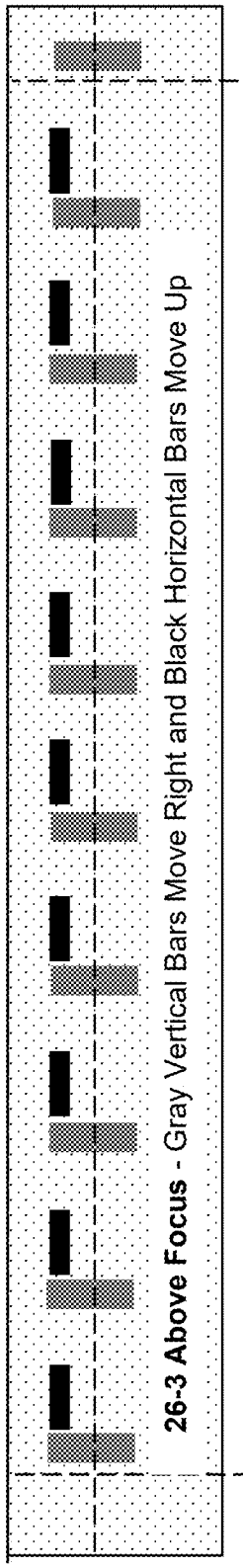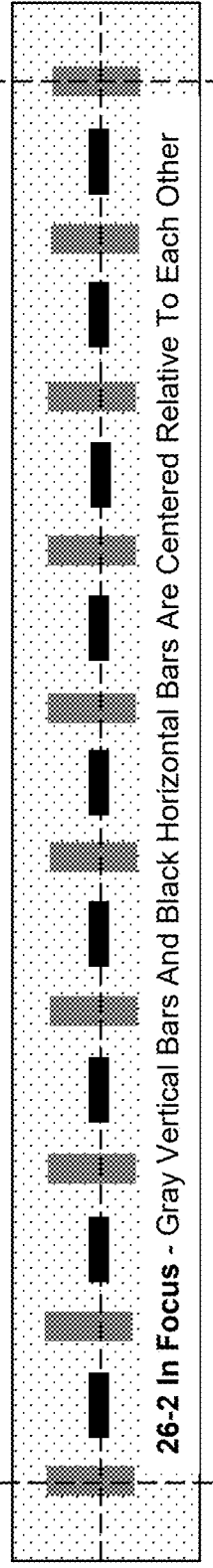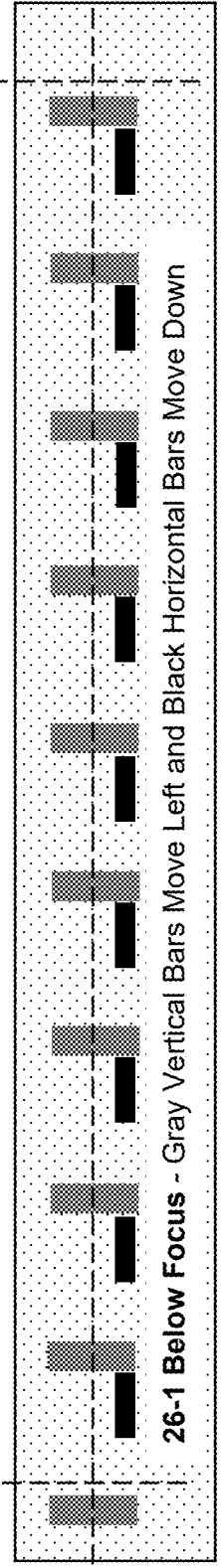
26-3 Above Focus - Gray Vertical Bars Move Right and Black Horizontal Bars Move Up
26-2 In Focus - Gray Vertical Bars And Black Horizontal Bars Are Centered Relative To Each Other
26-1 Below Focus - Gray Vertical Bars Move Left and Black Horizontal Bars Move Down
Pattern On Focus Camera
Figure 26A
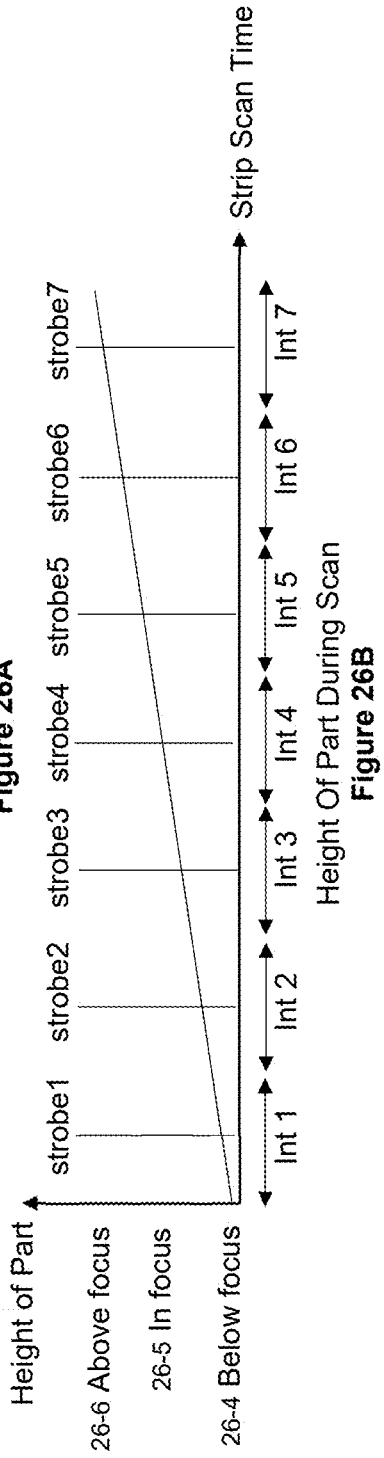
Height Of Part During Scan
Figure 26B

How To Project A Focus Pattern Onto A Part

Integrated Focus and Inspection System With Two Focus Patterns

Integrated Focus and Inspection System With Three Focus Patterns

In-Focus Fluorescent Image of 3 μm Traces
Metal Is Dark
Insulator Is Bright

In-Focus White Light Image of 3 μm Traces
Metal Is Bright
Insulator Is Dark

AUTO FOCUS SYSTEM FOR INSPECTION OF HIGH-DENSITY PARTS

CROSS REFERENCE TO RELATED APPLICATION(S)

This application claims priority to a co-pending U.S. Provisional Patent Application entitled "Auto Focus System For Inspection of High-Density Parts", Ser. No. 63/332,293 filed 19 Apr. 2022, the entire contents of which are hereby incorporated by reference.

TECHNICAL FIELD

This patent application addresses the problem of inspecting electronics parts and specifically keeping the part in focus during the inspection.

BACKGROUND

The density and complexity of electronic parts has greatly increased, over the years, creating a greater demand for real time process control and detection of fine line defects. U.S. Pat. No. 10,475,179, by Bishop et. al. (incorporated by reference herein) describes a system for such process control and defect detection which measures every feature and trace on an electronic part to sub-micron, sub-camera pixel accuracy, independent of feature and trace orientation. To perform these measurements, the part must remain in focus throughout the inspection. Unfortunately, prior art technology fails to meet the necessary focus requirements.

Prior art U.S. Pat. No. 9,113,091, by Bishop et. al. (incorporated by reference herein) describes a focus system for use in inspection of electronic parts, however the method described does not maintain focus for all trace orientations and features when the lines and traces become too small. To illustrate the modes of failure the prior art is applied to inspection of a fine line product.

SUMMARY

Problems with Prior Art

We begin by referring to FIGS. 1 and 2 herein, which are duplicates of FIGS. 12A and 13 copied from U.S. Pat. No. 9,113,091. In FIG. 1 herein, line 12-9 is projected onto a part at an angle relative to the surface of the part and the projected line is viewed by a focus camera 12-13. In FIG. 2, the focus line is projected onto surfaces 13-3, 13-4, and 13-5, located at different heights on the part and at different distances from the imaging optics. When viewed by the focus camera (13-6), line segments 13-3, 13-4, and 13-5 appear at different positions 13-3', 13-4' and 13-5' on the face of the focus camera. The position of these line segments on the focus camera are used to calculate the distance between the surface of a part and the focus optics, for the purpose of maintaining focus during inspection of a part.

However, this technique has limitations, FIG. 3 shows that if a surface (3-1) lies within the optical depth of focus (DOF), the projected line will appear in sharp focus. If the surface (3-2 or 3-3) lies outside the DOF, the projected line will widen and appear blurred, as indicated by widened edges 3-4 and 3-5. As the edges of the line blur our, detecting precise line position becomes more difficult. FIG. 4 shows the side view width of the projected line at in-focus height 4-1 and at out of focus heights 4-2 and 4-3. Arrows 4-4, 4-5, and 4-6 indicate the width of the focus line at each height.

Whether blurred or in focus however, the correct position of the line in prior art U.S. Pat. No. 9,113,091 must be determined to keep the part in focus during inspection. The position of the line on the camera can either be calculated from the location of its edges, or by computing the location of its centroid. Both techniques are well known to those in the art. The centroid is defined as the position in which the summed brightness intensity is equal on both sides of the centroid line. Centroid line positions are indicated at 3-6, 3-7, 3-8 in FIG. 3 and at 4-6 in FIG. 4. Centroid cross section brightness intensity profiles are indicated at 5-1 in FIG. 5 and at 6-1 in FIG. 6. In FIGS. 3 and 4 the centroid of the projected focus line moves from D1 to D2 to D3 as the surface changes height. Changes in position of the centroid line can be used to measure the distance between the optics (13-2) and the surface at 3-1, 3-2, 3-3, and ultimately to maintain focus, using the techniques described in the prior art. Alternatively, the edges of the projected lines can be used to measure line position, to implement the prior art, but this becomes difficult and produces inaccuracies when the edges become blurry.

Regardless of which method is used to determine line position, when the lines and traces become too small, there are certain trace orientations for which the methods described in U.S. Pat. No. 9,113,091 are no longer able to maintain focus. These modes of failure will now be described.

When the projected focus line is parallel to the change in surface height, as shown in FIG. 7, there exists a region immediately adjacent to the change in height that cannot be measured, because the focus beam is physically blocked. This region is marked L2 at 7-1 in FIG. 7.

If there are only a few such height transitions and missing measurements on a part, they can be averaged out when calculating focus position. However, as the density of traces and vertical height transitions increase, so does the number of missing measurements, as shown in FIG. 8. This will cause the system to go out of focus in such high-density, high aspect ratio, regions. In FIG. 8, the focus line cannot even reach lower surface S1 because it is blocked by the high aspect ratio traces.

FIG. 9 shows another mode of failure in which measurement errors occur at each transition between a reflective trace and very low or non-reflective insulator, even when the trace and insulator are at the same vertical height.

This mode of failure is especially problematic when the circuit trace line/space dimensions approach the width of a parallel oriented focus line. In FIG. 9, half the width of a projected focus line, W/2 at 9-1, is reflected off a metal circuit trace at 9-2, the other half of the focus line, positioned over a dark insulator at 9-3, is not reflected. The reflected signal viewed by the camera is therefore half the width of the projected line or W/2, as illustrated. This will result in an incorrectly calculated focus line position, whether using reflected line edge coordinates or the lines centroid value. If there are only a few such metal-insulator transitions, they can be averaged out when calculating focus position. However, as the density of traces and material transitions increase, so does the number of incorrect measurements, as shown in FIG. 9.

This will cause the system to go out of focus in such high-density trace areas. This is extremely problematic and prevents U.S. Pat. No. 9,113,091 from being used to inspect and keep in focus very high-density circuit patterns used in advanced wafers and substrate panels.

To further illustrate the severity of such a reduction in measured focus line width, consider the need to inspect fine line traces which require the use of high resolution, high numerical aperture, (NA) optics to detect small defects and imperfections in such traces. It is very difficult to maintain focus during the inspection because as optical resolution increases, optical depth of focus (DOF) decreases, as given by the following equations:

Resolution=$\lambda/2NA$

Depth of focus (DOF)=$\lambda/NA^2$+(pixsize)/($mag \times NA$)

where: $\lambda$=wavelength of illumination
NA=numerical resolution
pixsize=size of camera pixel
mag=objective imaging lens magnification As NA increases, the depth of focus (DOF) decreases as $NA^2$.

As an example, consider inspecting fine line 5-micron traces using a 10×0.3NA objective imaging lens, 10-1 in FIG. 10, corresponding to lens 12-8 in FIG. 1. This lens has a resolution of 0.83 microns (µm) and a depth of focus (DOF) of +/−4.2 µm, as indicated in FIGS. 10 at 10-2 and 10-4. In accordance with prior art U.S. Pat. No. 9,113,091, the projected line (12-9) is viewed by focus camera (12-13) in FIG. 1. In this example we use a focus camera with a 6 µm pixel size. FIG. 10 shows that as the part moves from being in optimal focus, with a height Z=0 µm at 10-3, to being out of focus, with a height Z=+4.2 µm at 10-4, the projected focus line moves a horizontal distance on the part of 0.9 µm, at 10-5. To provide a margin of safety, it is best to keep the Z focus height away from the absolute+/−4.2 µm limits and maintain focus to within +/−2.1 µm on the part, indicated at 10-6 and 10-7. This requires measuring the position of the focus line on the part to within 0.45 µm, as indicated at 10-8. With the 10x objective lens, this corresponds to 4.5 µm on the focus camera. For a 6 µm camera pixel, this requires measuring the position of the focus line to a sub-pixel accuracy of 0.75 pixels (4.5 µm/6 µm), which is impossible given that the width of the projected focus line can vary by up to 50%. As a result, this prior art system will not be able to maintain focus during inspection of such parts.

The described multiple modes of failure prevent U.S. Pat. No. 9,113,091 from being used to inspect and keep in focus very high-density circuit patterns used in advanced wafers and substrate panels in which traces and features can exist in all possible orientations.

BRIEF SUMMARY OF PREFERRED EMBODIMENTS

It is therefore an object to provide a method to keep a part in focus at it is being inspected independent of feature and trace density and orientation.

In accordance with one aspect a method for keeping a part in focus projects multiple patterns onto a part. Each projected pattern is composed of multiple copies of a given geometric shape. The projected patterns are viewed with a focus camera. Each pattern is projected at a different wavelength, vector angle and vector direction relative to a perpendicular drawn to the focus camera optics. The geometric shapes in each pattern move on the surface of the focus camera as a function of projected vector angle, projected vector direction and changes in vertical height between the features on the part and focus optics. The patterns on the focus camera are divided into slices. Each slice is oriented parallel to the vector angle and vector direction of motion of the geometric shapes on the focus camera corresponding to the same direction of motion on the part. The width and signal intensity of the slices on the focus camera are measured. Each individual width/intensity slice measurement, above a minimum predetermined brightness signal intensity is compared to an expected width, and only if within predetermined width tolerances is the slice measurement considered valid. The expected width corresponds to the width of a slice for a fully reflected shape. The location of valid slice measurements on the focus camera are recorded. Valid slice measurement locations on the camera, corresponding to positions on the part, are processed to calculate the distance between the part and lens optics at the measured positions. These calculated distance measurements are used to keep the part in focus, across the optical field of view, as the part is being inspected.

In accordance with a second aspect, a method for keeping a part in focus projects different patterns onto a part being inspected. Each different projected pattern is composed of multiple copies of a geometric shape. The patterns projected onto the surface of the part are viewed with a focus camera. Each pattern is projected at a different wavelength, vector angle and vector direction relative to a perpendicular drawn to the focus camera optics. The geometric shapes in each pattern move on the surface of the focus camera as a function of projected vector angle, projected vector direction and changes in vertical height between the features on the part and focus camera optics. A known good reference shape is fit to the edge points or perimeter points of one or more shapes on the surface of the focus camera to create best fit positions. These best fit positions are used to calculate the distance between the part and focus optics at the corresponding positions on the part, and to calculate the height profile of the part. The height profile is used to adjust the vertical distance between the part and focus camera optics to keep the part in focus across the optical field of view, as the part is being inspected.

BRIEF DESCRIPTION OF THE DRAWINGS

The description below refers to the accompanying drawings, of which:

FIG. 15A is an illustration showing multiple slice measurements;

FIG. 17 is a pattern on a focus camera showing part height for the entire field of view of the imaging lens;

FIG. 18 illustrates how patterns projected from different angles enables focusing of high-density high aspect ratio structures;

FIGS. 19A and 19B illustrate how projected patterns move along projected vectors as a function of height;

FIG. 26A shows a pattern on a focus camera when below focus, in-focus, and above focus;

FIG. 26B is a graph showing the height of a part during a scan;

DESCRIPTION OF ILLUSTRATIVE EMBODIMENTS

Therefore, it is an object to provide a method and apparatus for keeping a part in focus, within the optical depth of field (DOF) of the imaging optics, during inspection thereof independent of feature and trace orientation.

Figure 11A:
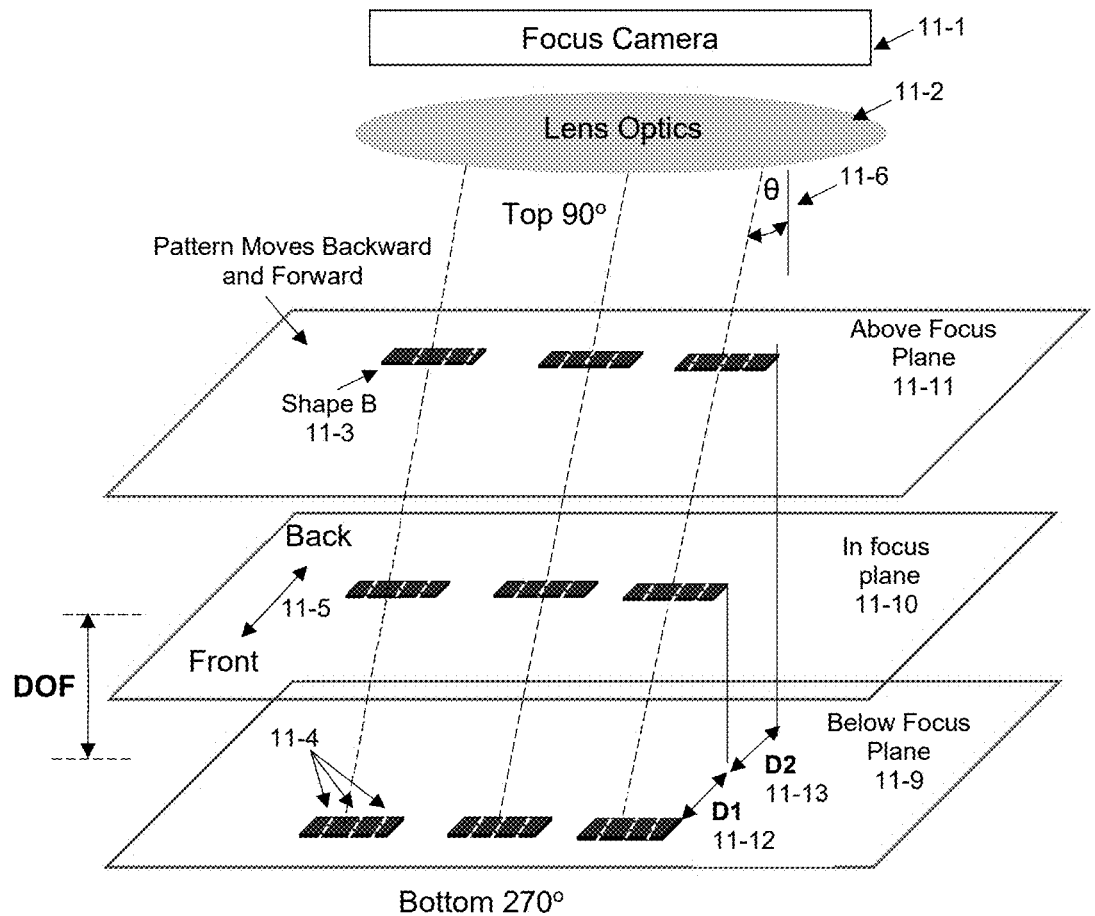
FIGS. 11A and 11B show a first pattern projected onto a part.
Figure 12A:
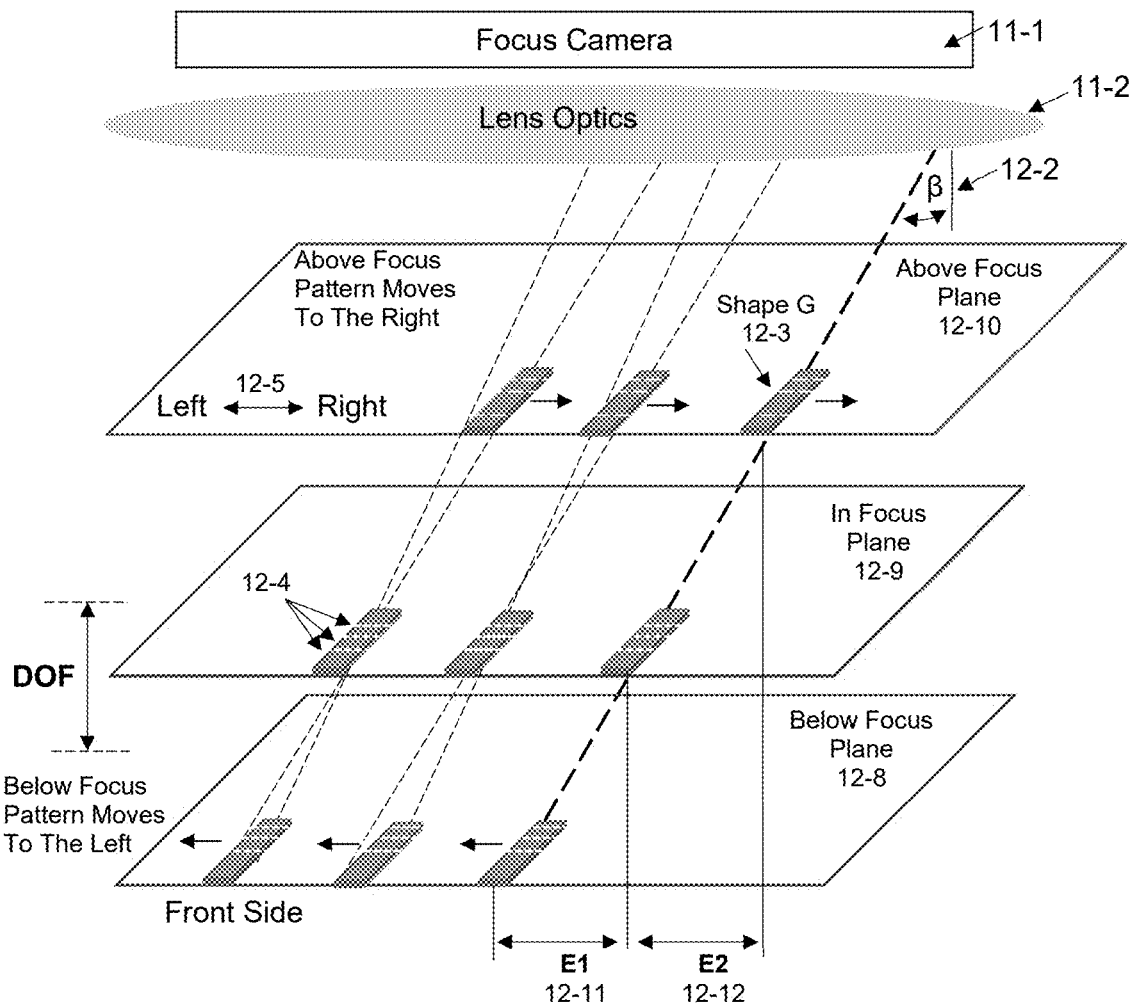
FIGS. 12A and 12B show a second pattern projected onto a part.
Figure 13A:
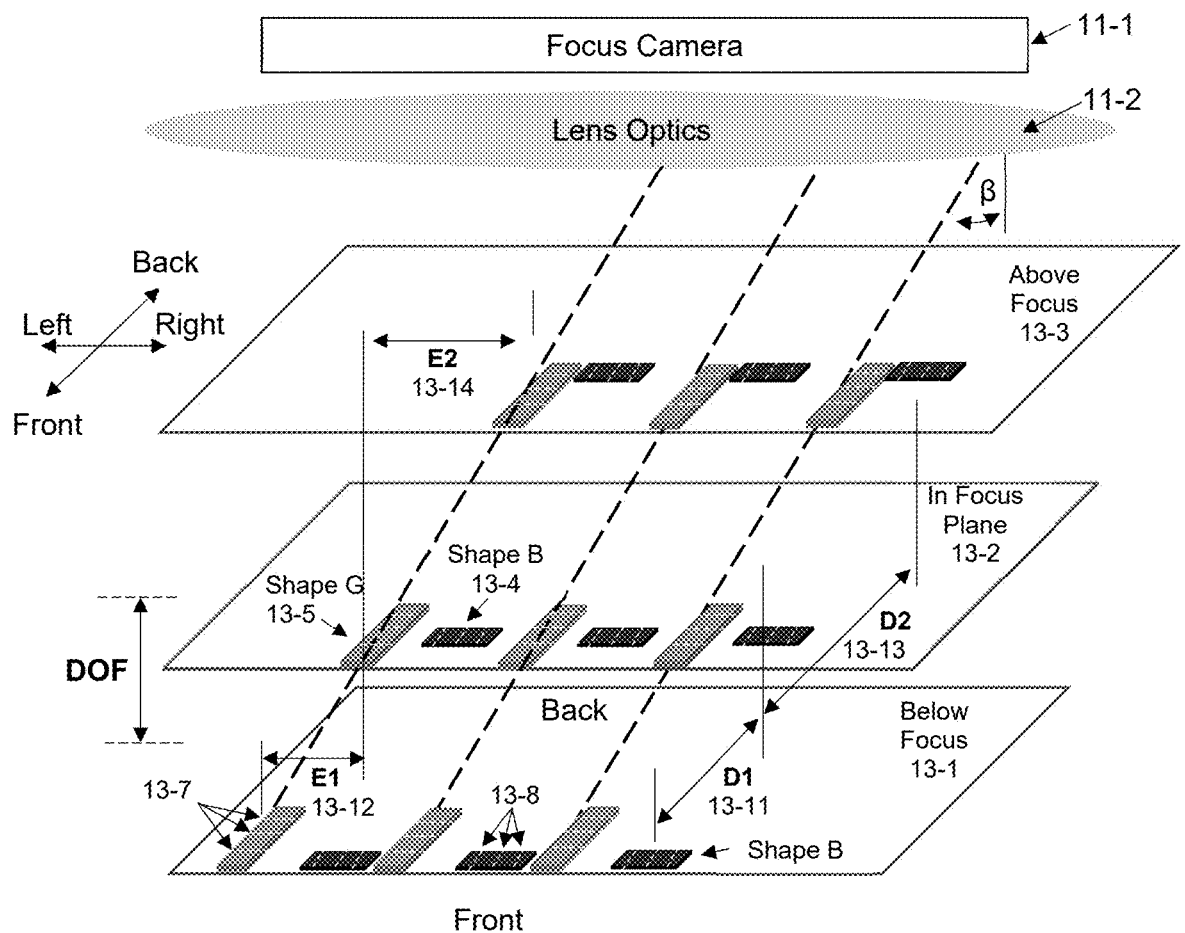
FIGS. 13A and 13B show a first and second pattern simultaneously projected onto a part.

The embodiments described herein comprise projecting two or more different patterns onto a part being inspected for defects or dimensional accuracies, with each different pattern composed of multiple copies of a given geometric shape. As an example, FIG. 11A shows a first projected pattern composed of multiple copies of a first geometric shape (shape B) represented by a black rectangle at 11-3. FIG. 12A shows a second projected pattern composed of multiple copies of a second geometric shape (shape G), represented by a gray rectangle at 12-3. FIG. 13A shows the two patterns, with shapes B and G, simultaneously projected onto the part at 13-4 and 13-5. The projected patterns are viewed by focus camera 11-1, shown in FIGS. 11A, 12A, and 13A.

Figure 11B:
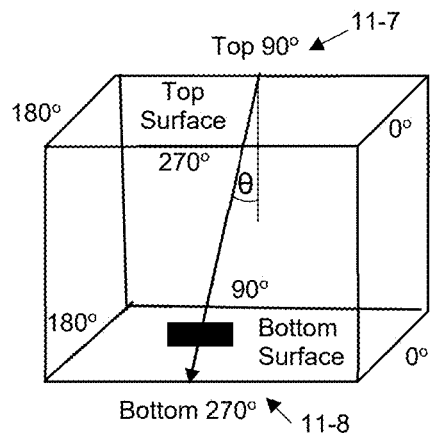

Each different pattern is projected onto the part at a different wavelength, vector angle and vector direction relative to a perpendicular drawn to the focus camera optics. As an example, in FIGS. 11A and 11B, a first pattern, consisting of black shaped rectangles, shape B at 11-3, is projected at wavelength B and at an angle theta (e) (11-6) relative to a perpendicular drawn to the focus camera optics. In this example, in FIG. 11B, the projected beam travels from the 90-degree position on the top surface at 11-7, to the lower 270-degree position on the bottom surface of the cube at 11-8.

Figure 12B:
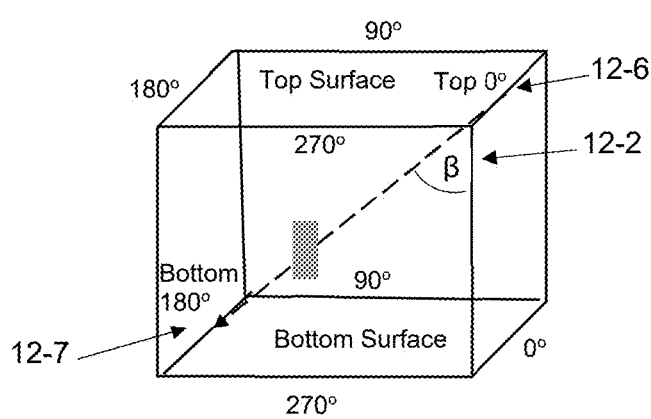

In FIGS. 12A and 12B, the second pattern, consisting of gray shaped rectangles, shape G at 12-3, is projected at wavelength G and at an angle beta (B) (12-2) relative to a perpendicular drawn to the focus camera optics. In this example, in FIG. 12B, the projected beam travels from the 0-degree position on the top surface at 12-6, to the lower 180-degree position on the bottom surface of the cube at 12-7.

The geometric shapes in each pattern move on the part and on the surface of the focus camera as a function of projected vector angle, projected vector direction and changes in vertical height between the features on the part and focus camera optics. In FIG. 11A, the projected black rectangles, shape B, move front and back on the surface of the part and focus camera, as the distance between the part and camera lens changes, as indicated by arrow 11-5. If the part moves from being in-focus on plane 11-10 to being below focus on plane 11-9, the projected black rectangles, shape B, move forward by a distance D1, as illustrated at 11-12. If the part moves from being in-focus on plane 11-10 to being above focus on plane 11-11 the black rectangles, shape B, move backward by a distance of D2, as indicated at 11-13.

In FIG. 12A, the projected gray rectangles, shape G at 12-3, move left and right on the surface of the part, and focus camera, as the distance between the part and camera lens changes, as indicated by arrow 12-5. If the part moves from being in-focus on plane 12-9 to being below focus on plane 12-8, the projected gray rectangles, shape G, move left by a distance E1, as illustrated at 12-11. If the part moves from being in-focus on plane 12-9 to being above focus on plane 12-10 the gray rectangles, shape G, move right by a distance of E2 as indicated at 12-12.

Figure 13B:
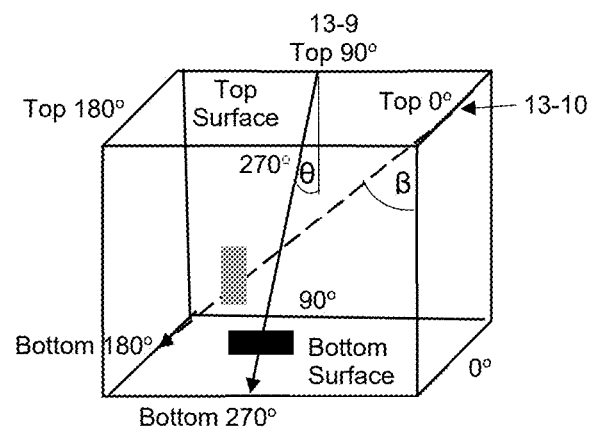

FIG. 13A shows the black rectangle, shape B, pattern of FIG. 11A at 13-4 and gray rectangle, shape G, pattern of FIG. 12A at 13-5, simultaneously projected onto the part from different angles and vector directions. The black rectangle, shape B, pattern is projected at an angle theta (θ) from the top surface 90-degree position toward the bottom surface 270-degree position, as shown in FIG. 13B at 13-9. Simultaneously, the gray rectangle, shape G, pattern is projected at an angle beta (B) from the top surface 0-degree position toward the bottom surface 180-degree position as shown at 13-10. FIG. 13A shows the black pattern, shape B at 13-4, and gray pattern, shape G at 13-5, shapes projected onto the part, when the part is below focus at 13-1, in-focus at 13-2, and above focus at 13-3. As the part moves from the in-focus plane (13-2) to the below focus plane (13-1), the black rectangles, shape B, move a distance D1 forward at 13-11 and the gray rectangles, shape G, move a distance E1 to the left at 13-12. As the part moves from the in-focus plane (13-2) to the above focus plane (13-3), the black rectangles, shape B, move a distance D2 toward the back at 13-13 and the gray rectangles, shape G, move a distance E2 to the right at 13-14.

Figure 14A:
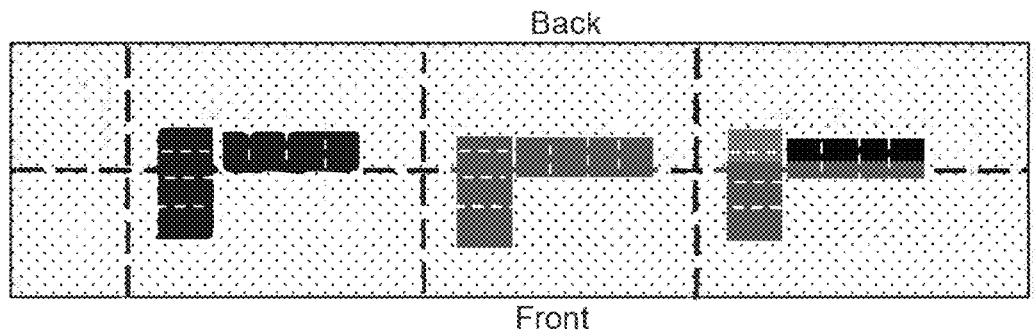
FIGS. 14A, 14B and 14C show pattern images as seen on the surface of the focus camera.
Figure 14B:
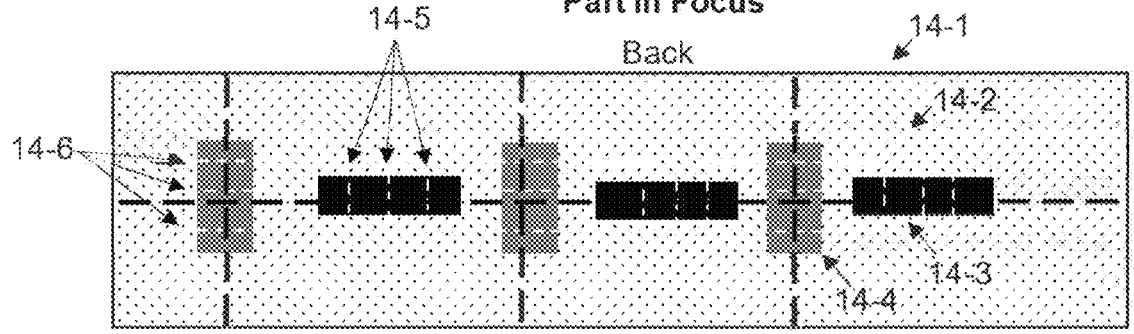
Figure 14C:
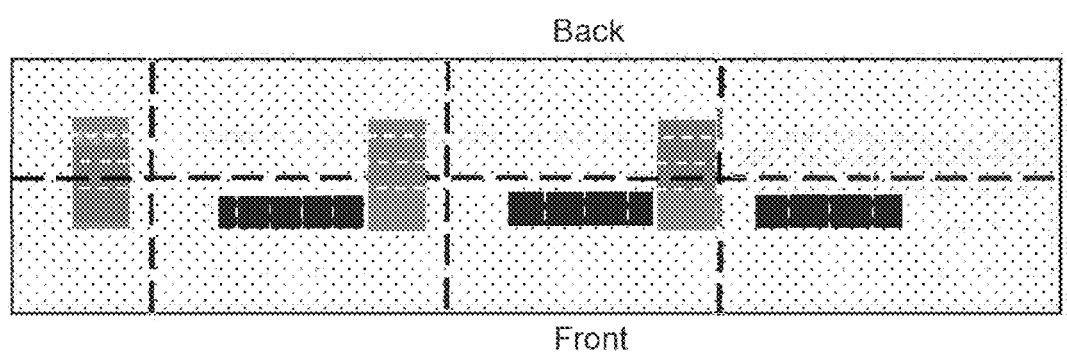

FIGS. 14A, 14B, and 14C show the black, shape B, and gray, shape G, shapes as they appear on the surface of the focus camera when the part is in-focus at FIG. 14B, above-focus at FIG. 14A, and below focus at FIG. 14C. The black dots (14-2) in FIG. 14B represent camera pixels.

To calculate the distance between the part and lens optics from the moving shapes, the shapes are divided into slices. Each slice is oriented parallel to the vector angle and vector direction of motion of the geometric shapes on the focus camera, as shown at 14-5 and 14-6 in FIG. 14B. This is the same direction of motion that the projected shapes move on the part, as illustrated in FIG. 13A at 13-8 and 13-7.

FIG. 11A contains black rectangles, shape B at 11-3, that move forward and backward as the part moves below and above focus. Arrows 11-4 show three slices superimposed on the rectangles with each slice oriented parallel to the direction of motion. FIG. 12A contains gray rectangles, shape G at 12-3, that move left and right as the part moves below and above focus. Arrows 12-4 show three slices superimposed on the rectangles with each slice oriented parallel to the direction of motion.

FIG. 13A contains both black rectangles, shape B at 13-4, and gray rectangles, shape G at 13-5. Arrows 13-7 and 13-8 show slices oriented parallel to the direction of motion for each shape.

Figures, 14A, 14B, and 14C show both black rectangles at 14-3 and gray rectangles at 14-4 as they appear on the focus camera. Arrows 14-5 and 14-6 show the slices oriented parallel to the direction of motion for each shape.

Figure 9:
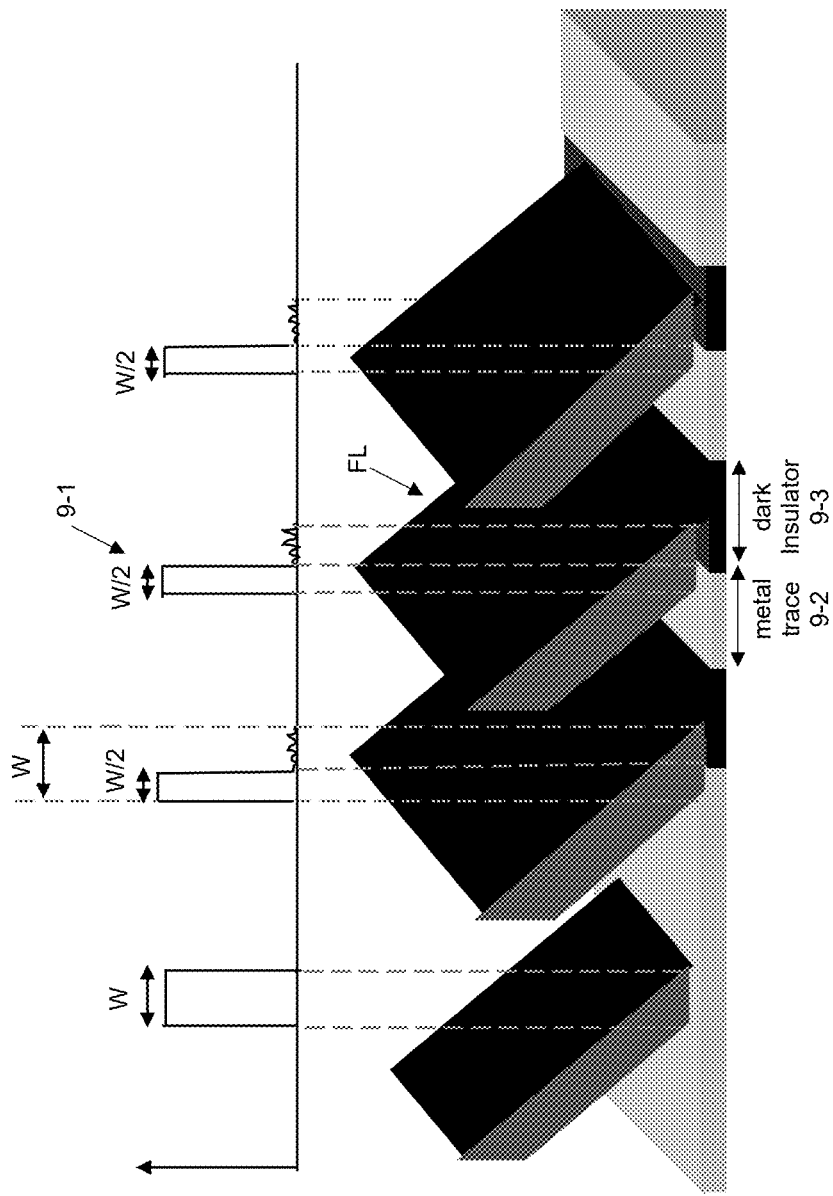
FIG. 9 is an illustration showing measurement errors at transitions between reflective traces and a very low or non-reflective insulator.

FIG. 15A shows how this new approach uses slice measurements to calculate focus height (the distance between the part and focus optics). This figure shows how this new approach functions at the boundary of a bright metal trace and dark insulator where prior art U.S. Pat. No. 10,475,179 failed as previously described and illustrated in FIG. 9.

Figure 15B:
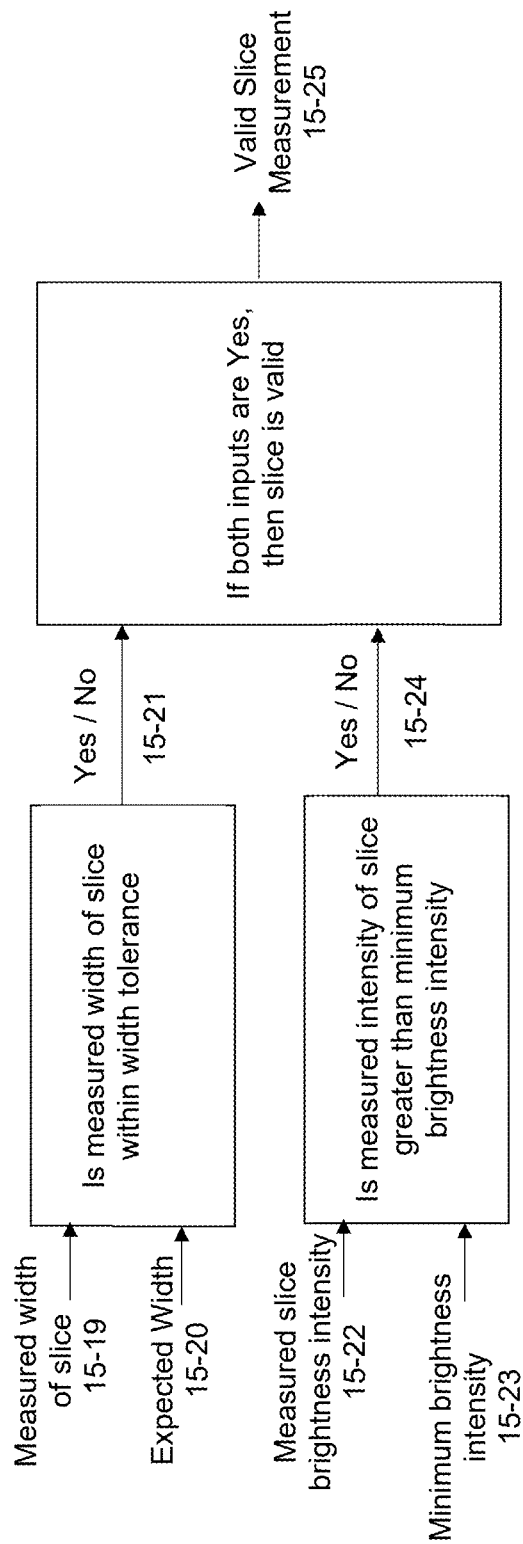
FIG. 15B is a block diagram showing the rules for determining if a slice measurement is valid.

Black shaped rectangle 15-1 and gray shaped rectangle 15-10 are projected onto a transition between a bright reflective metal trace 15-2, and non-reflective dark insulator 15-3. Only half the width of projected slices 15-4, 15-5, and 15-6, (that is, the half that is reflected off bright metal 15-2), produces a detectable signal on the focus camera at 15-8. All three projected slice signals measure W/2, at 15-8, whereas the correct width should be W, as indicated by arrow 15-7. In FIG. 15B, the measured width of the slice, at 15-19, is compared to the expected width (W) at 15-20 and only if the measured width is within a predetermined width tolerance at 15-21, and greater than a predetermined minimum brightness intensity at 15-22, 15-23, 15-24, is the measurement considered valid at 15-25. Thus, measured width of W/2 is considered invalid and is ignored at 15-25 in this example.

Another invalid measurement is produced by slice 15-11 in FIG. 15A. When gray shape 15-10 is projected onto non-reflecting dark insulator 15-3 at slice location 15-11, it produces a very weak signal (15-17) on the camera, which is below the minimum intensity required to produce a valid measurement at 15-24 and 15-25.

Slice width measurements are computed for all the projected shapes. Only those slice measurements greater than the minimum predetermined brightness intensity at 15-24 and within predetermined width tolerances at 15-21 are considered valid slice measurements at 15-25 and used to calculate focus heights (distances between the part and focus optics). Examples of valid slices are indicated at 15-12 and 15-13 in FIG. 15A. These slices produce strong brightness intensities and measure the correct width (W1) at 15-15. Therefore, these measurements are valid and can be used to calculate focus heights (distances between the part and focus optics).

Figure 16:
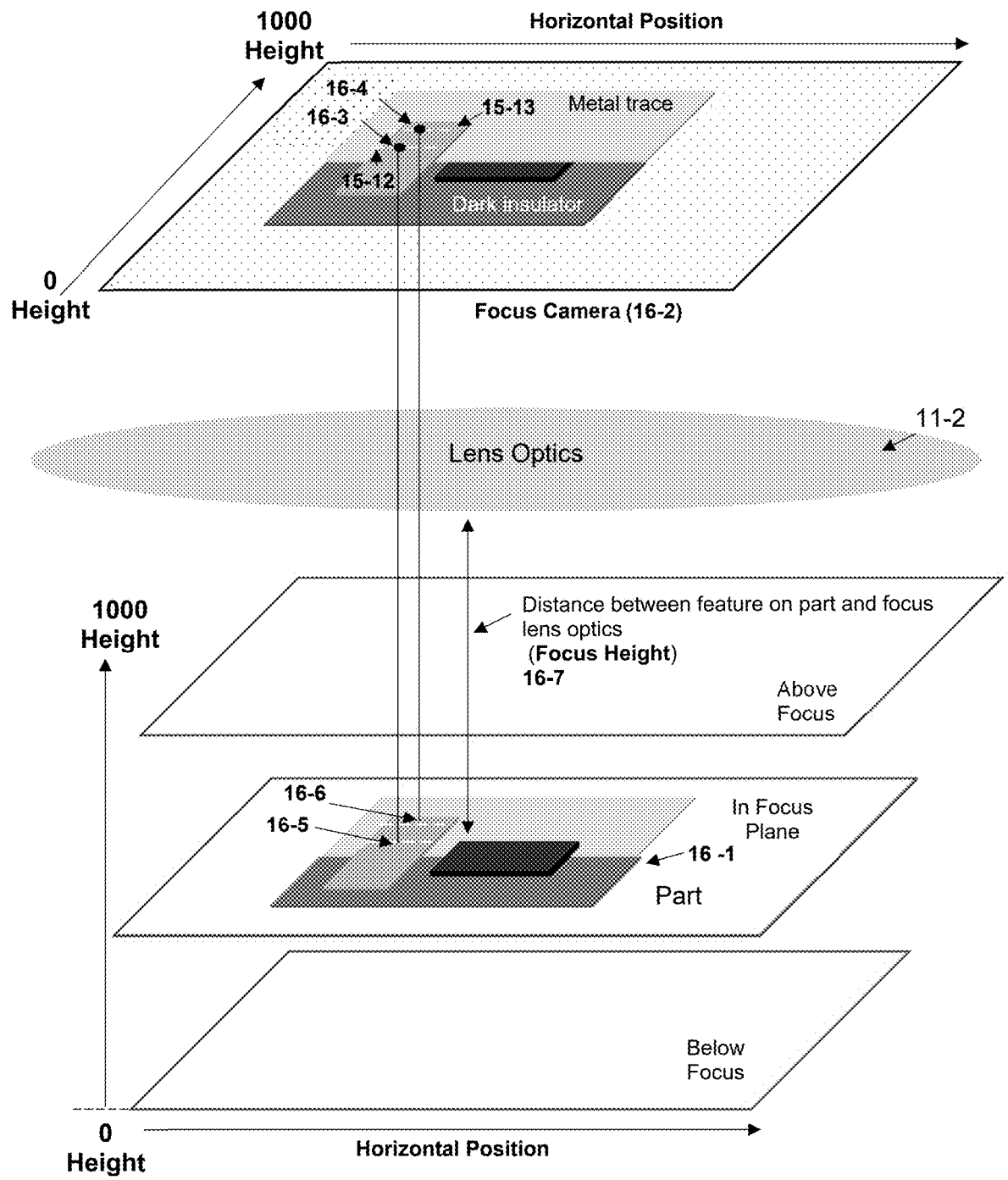
FIG. 16 illustrates how valid slice measurements are used to calculate focus height.

FIG. 16 shows the pattern and shapes of FIG. 15A projected onto the part at 16-1 and shows valid measurement slices 15-12 and 15-13 as they appear on focus camera 16-2. Camera pixel coordinates and intensity values are used to calculate the location of the centroid for each slice. In this example, slice location on the camera is represented by the coordinates of its centroid. In other applications it may be represents by the location of its edge coordinates. Arrows 16-3 and 16-4 indicate the coordinates of the centroids for slices 15-12 and 15-13 respectively. Arrows 16-5 and 16-6 show the corresponding centroid positions on the part.

Valid slice locations on the focus camera, corresponding to positions on the part, are processed to calculate the distance between the part and lens optics at the measured positions within the optical field of view, as indicted by focus height 16-7.

FIGS. 15A and 16 illustrate that independent of trace orientation, and even in parts with high density bright traces and dark insulators, projecting shapes from different vector angles and different vector directions can ensure that there will always be some slice measurements that can be used to compute focus heights. This is one of the improvements over prior art U.S. Pat. No. 9,113,091.

In the example of FIG. 17, a pattern of shapes is projected onto the entire optical field of view of a part. This Figure shows the pattern as it appears on the focus camera. Focus heights can be computed for each valid slice measurement to produce a focus height profile for the entire field of view.

For example, in the upper left corner at 17-1, the part is in focus at nominal height, at 17-2 the part has a high area, and at 17-3 the part has a low area.

The focus height profile can be used to adjust the distance between the part and focus camera optics to keep the part in focus within the optical depth of field across the field of view.

Figure 1:
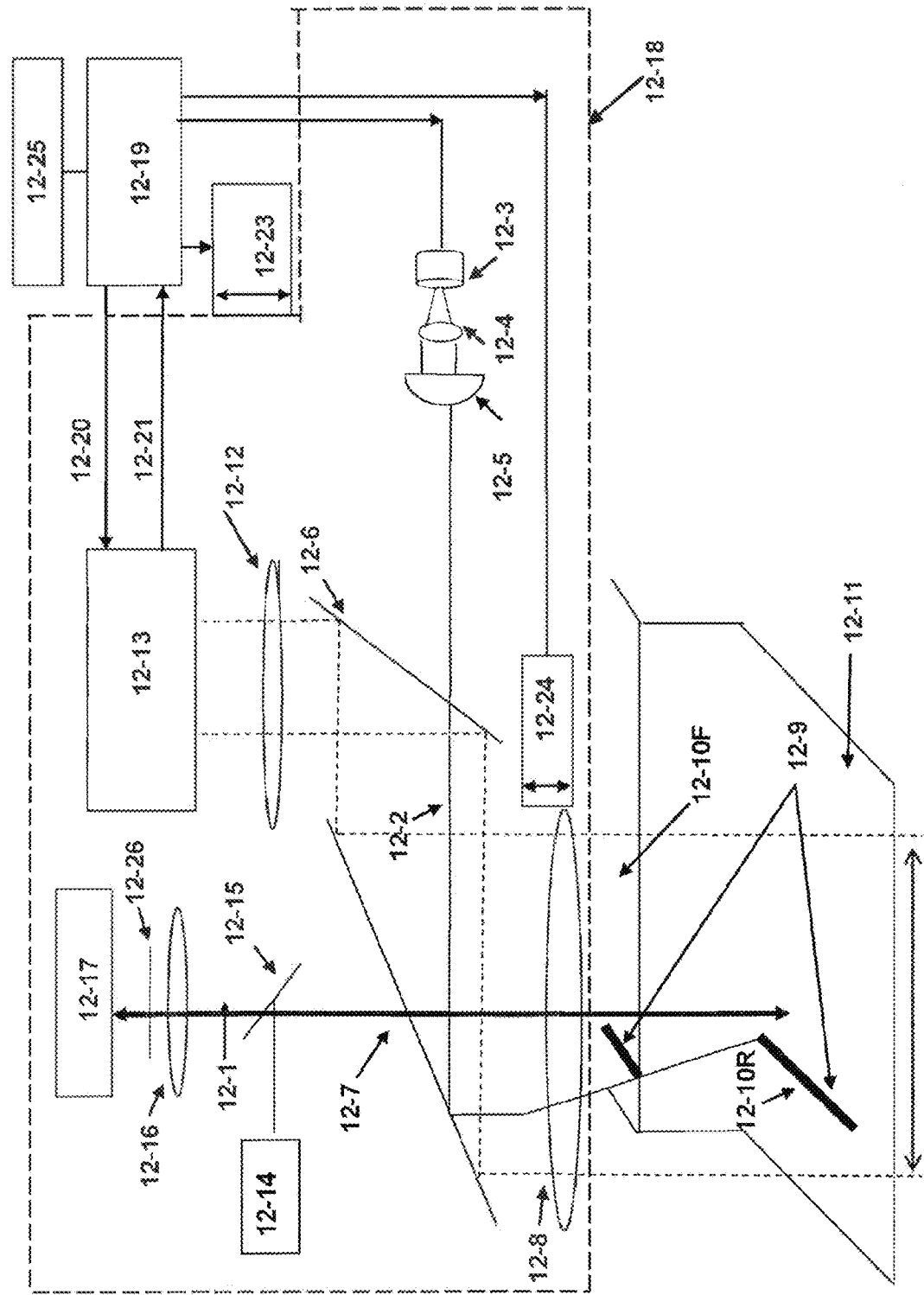
FIG. 1 is a block diagram of a prior art focus system from U.S. Pat. No. 9,113,091.
Figure 2:
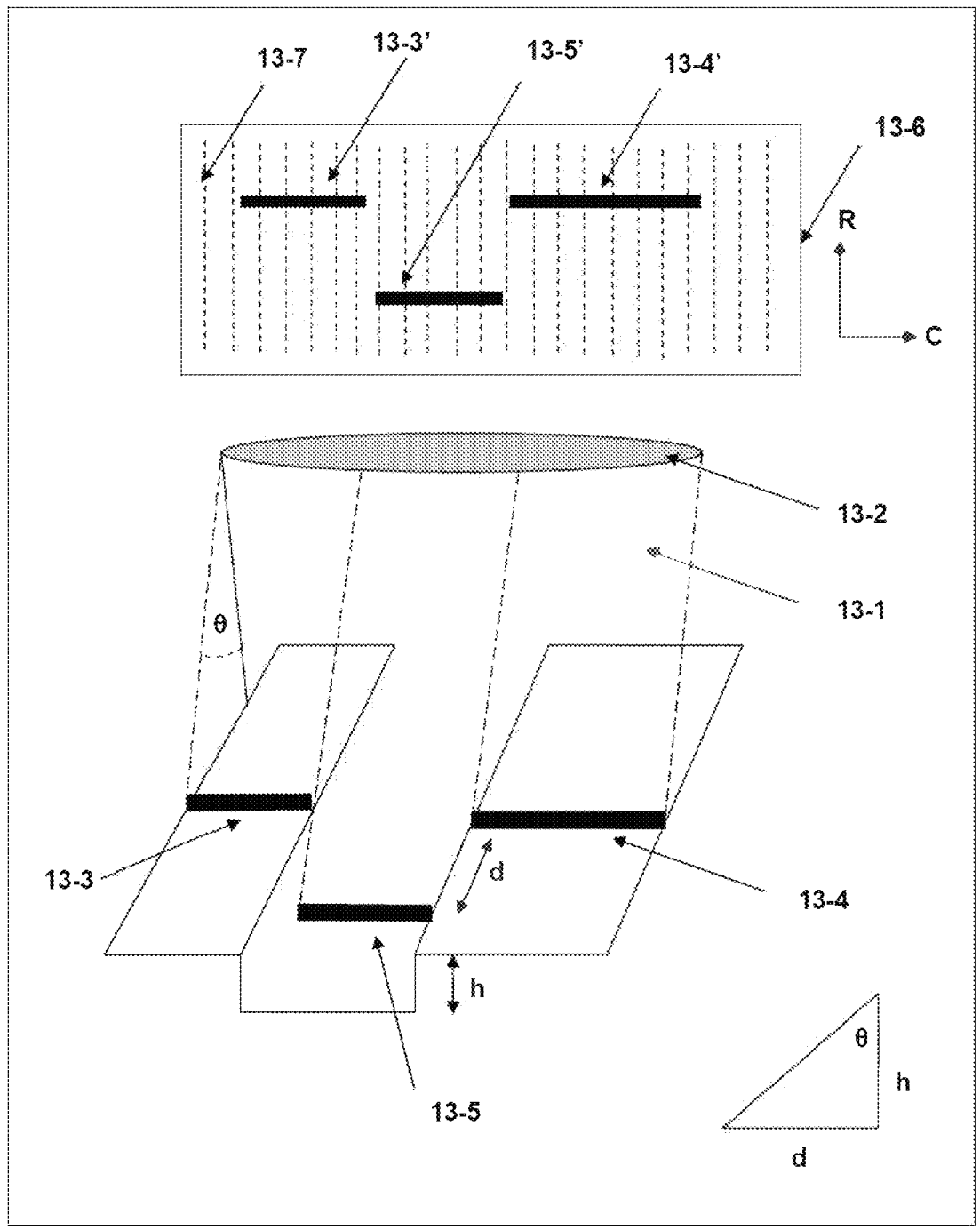
FIG. 2 is an illustration from prior art U.S. Pat. No. 9,113,091 showing a focus camera viewing a projected focus line.
Figure 3:
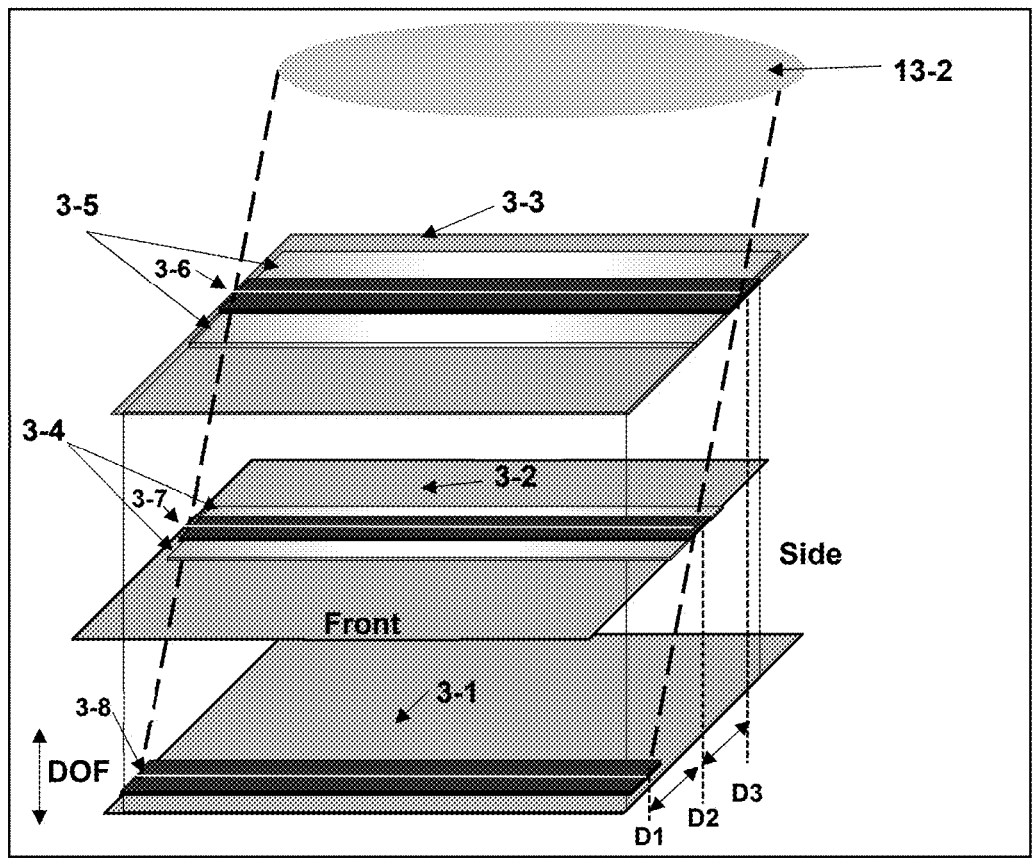
FIG. 3 is an illustration showing a focus line projected onto a part at different heights.
Figure 4:
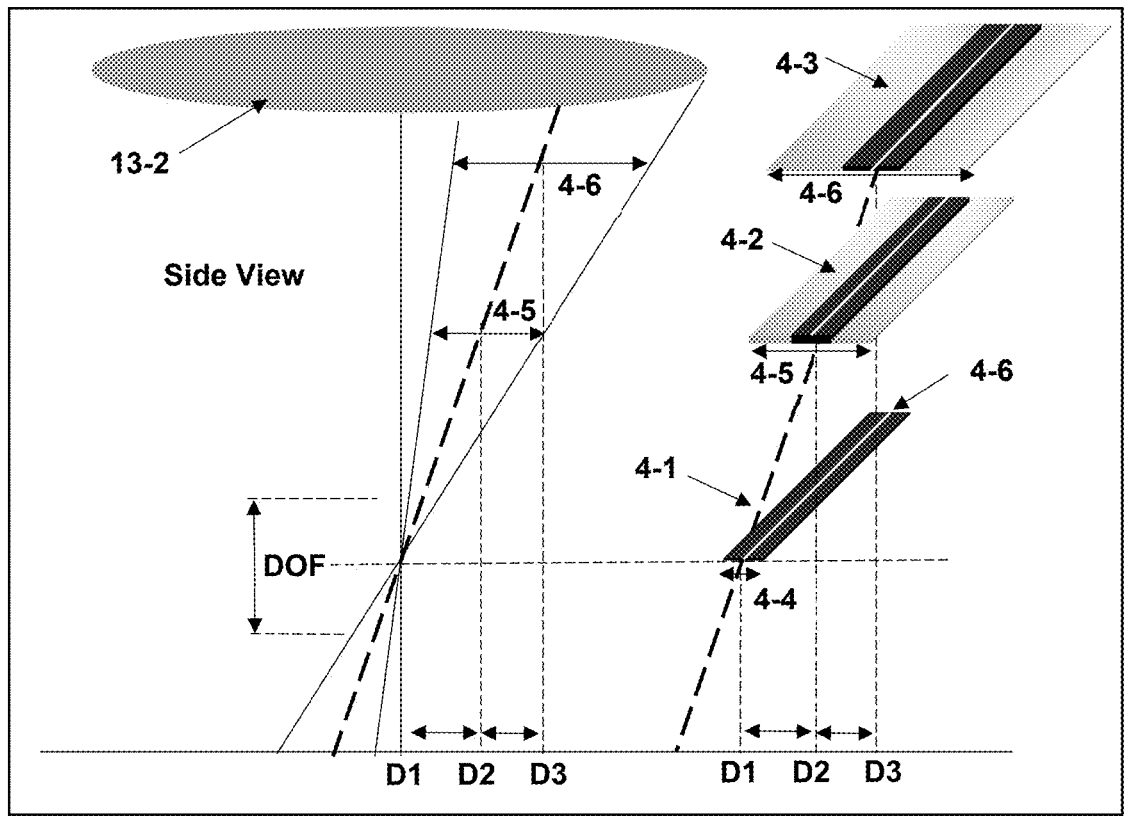
FIG. 4 shows the side view of the projected focus line.
Figure 5:
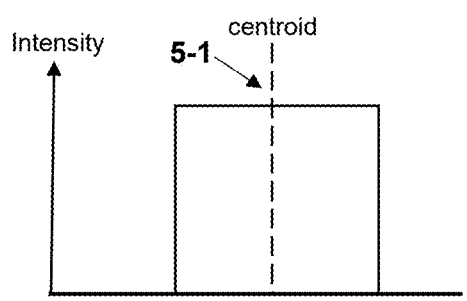
FIG. 5 is an illustration showing the cross section of an in-focus line indicating location of the centroid.
Figure 6:
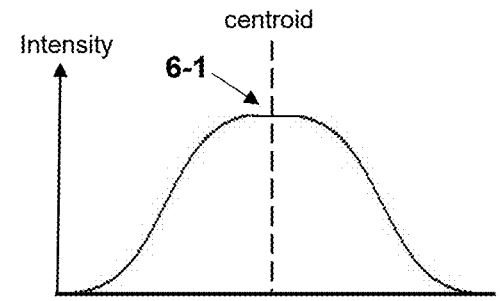
FIG. 6 is an illustration showing the cross section of an out-of-focus line indicating location of the centroid.
Figure 7:
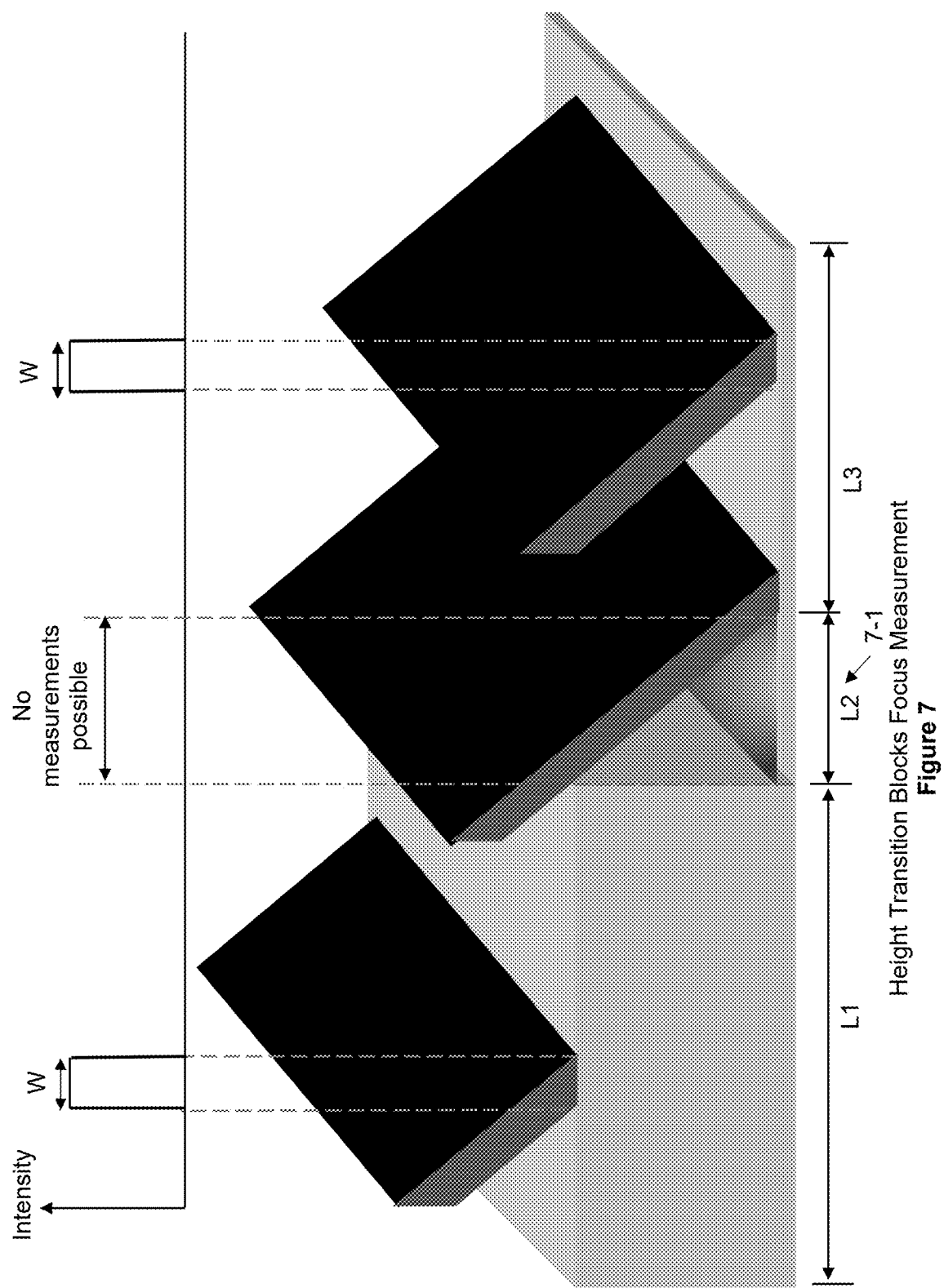
FIG. 7 is an illustration showing how a transition is height blocks a focus measurement.
Figure 8:
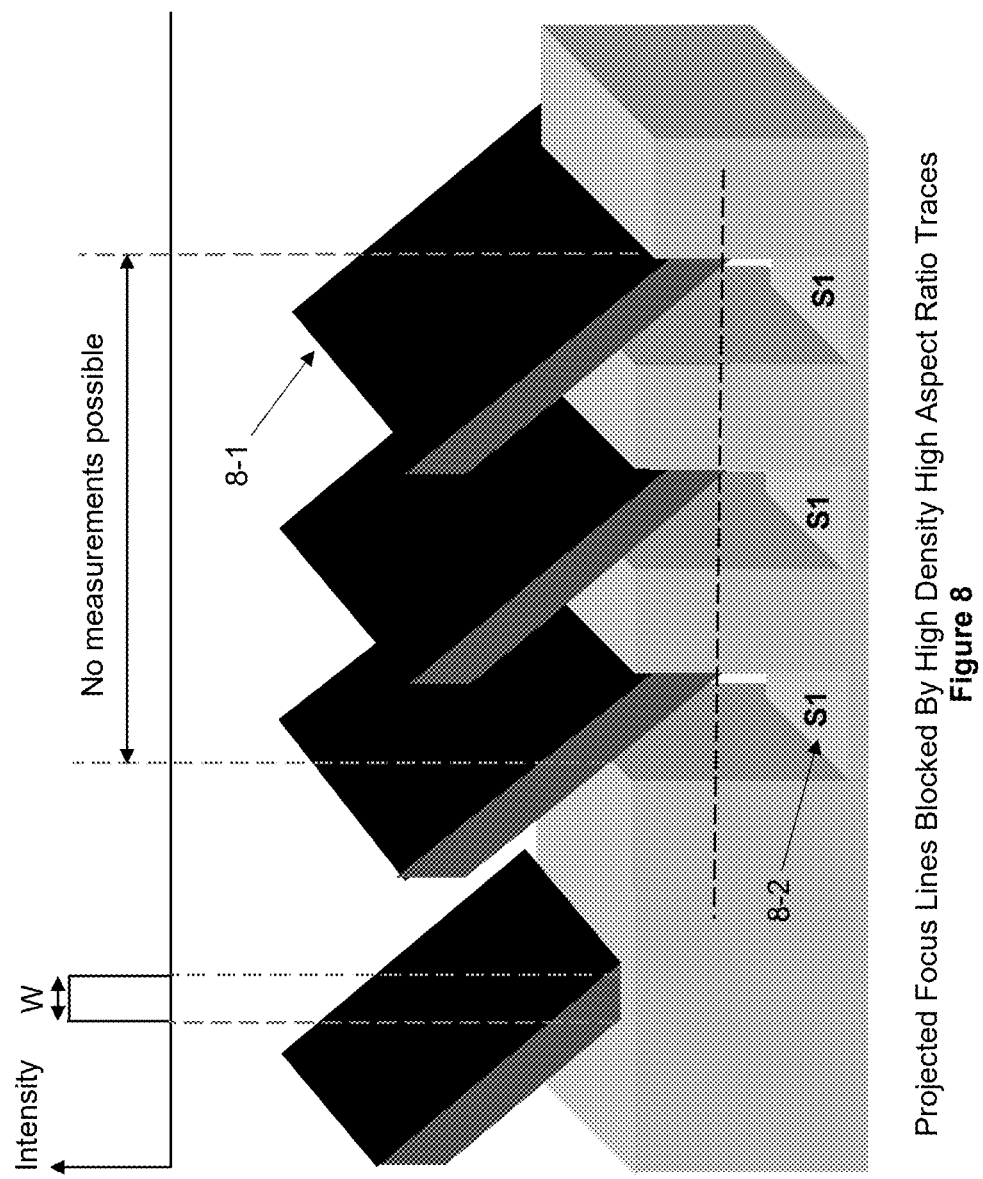
FIG. 8 is an illustration showing projected focus lines blocked by high density high aspect ratio traces.

FIG. 18 illustrates another improvement over the prior art. In U.S. Pat. No. 9,113,091, it was not possible to obtain focus height measurements in high density, high aspect ratio parts, because the projected pattern 18-1 was blocked from reaching the lower surface S1 at 18-3. This was previously explained and illustrated in FIG. 8. The addition of a pattern of shapes projected from a different angle and vector direction at 18-2 enables the projected shapes to reach lower surface 18-3, without being blocked. Shapes projected onto surface 18-3 are imaged onto the focus camera and used to calculate valid focus height measurements.

FIG. 19A is another example showing three patterns and shapes projected onto a part from different angles and vector directions and at different wavelengths. The first shape in a black rectangle at 19-1, projected at wavelength 1 from the 90-degree position on the top surface of the cube, at 19-7, travels toward the 270-degree position on the lower surface at 19-8. Black rectangle 19-1 travels along vector 19-2 as a part changes height. The second shape in a gray rectangle 19-3, projected at wavelength 2 from the 0-degree position on the top surface of the cube at 19-9, travels toward the 180-degree position on the lower surface at 19-10. Gray rectangle 19-3 travels along vector 19-4. The third shape in a dotted rectangle 19-5, projected at wavelength 3 from the 135-degree from a position on the top surface of the cube at 19-11 toward the 315-degree position on the lower surface at 19-12. Gray rectangle 19-5 travels along vector 19-6. FIG. 19B shows how the three projected shapes move along their vectors, as a function of height.

Figure 20A:
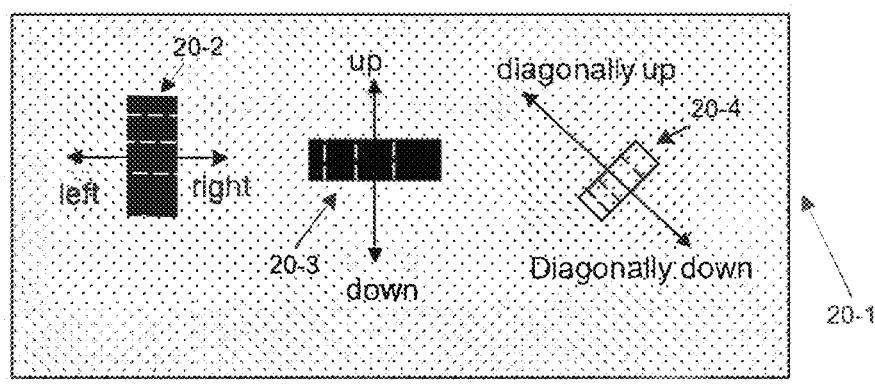
FIG. 20A illustrates how projected patterns move on the focus camera as a function of focus height.
Figure 20B:
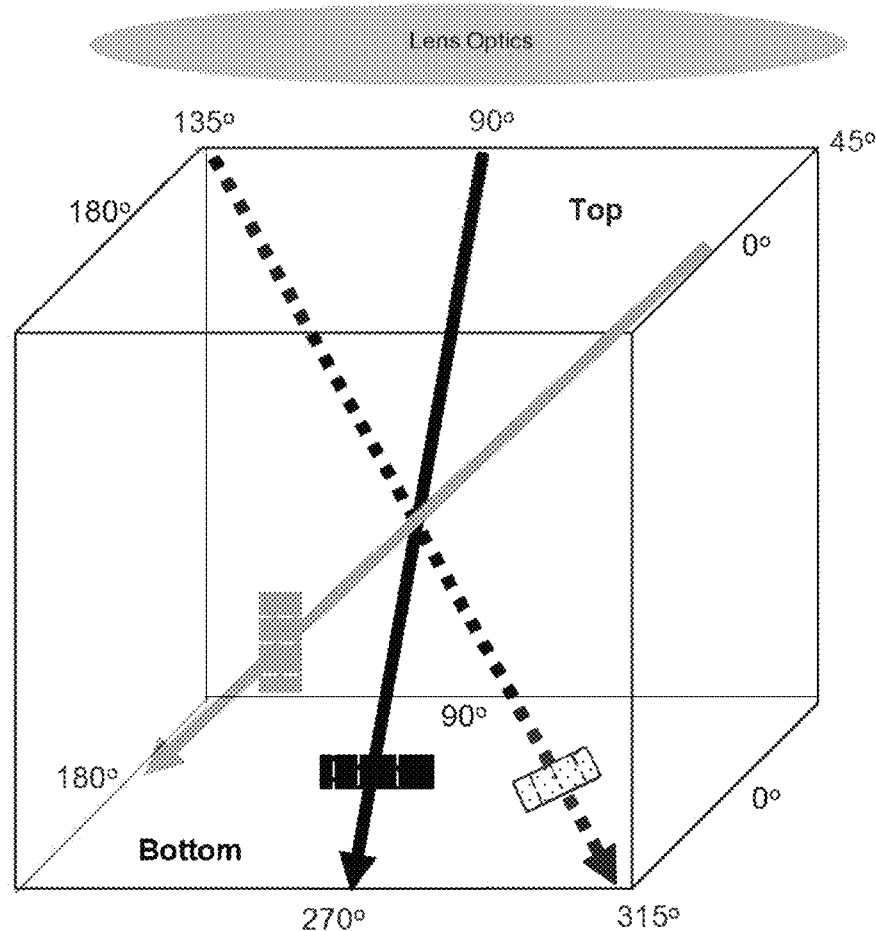
FIG. 20B illustrates how projected patterns move along projected vectors as a function of focus height.

FIGS. 20A and 20B show the direction of shape motion on the focus camera relative to position and height on the part. When the part moves down (e.g., the distance between the objective lens and a corresponding feature on the part is smaller than expected), gray rectangle 20-2 on the camera moves to the left, black rectangle 20-3 moves down, and dotted rectangle 20-4 moves along a diagonal down and to the right. When the part moves up (e.g., the distance between the objective lens and a feature on the corresponding part is greater than expected), gray rectangle 20-2 moves to the right on the camera, black rectangle 20-3 moves up, and dotted rectangle 20-4 moves along a diagonal up and to the left.

Figure 21A:
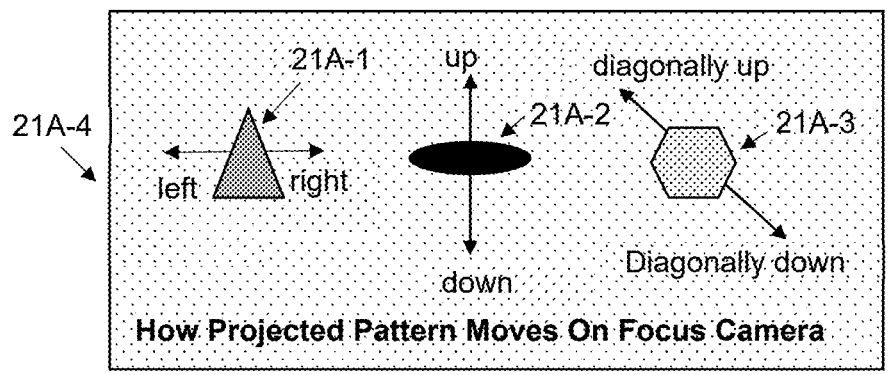
FIG. 21A is an illustration showing how projected patterns move on the focus camera as a function of focus height.
Figure 21B:
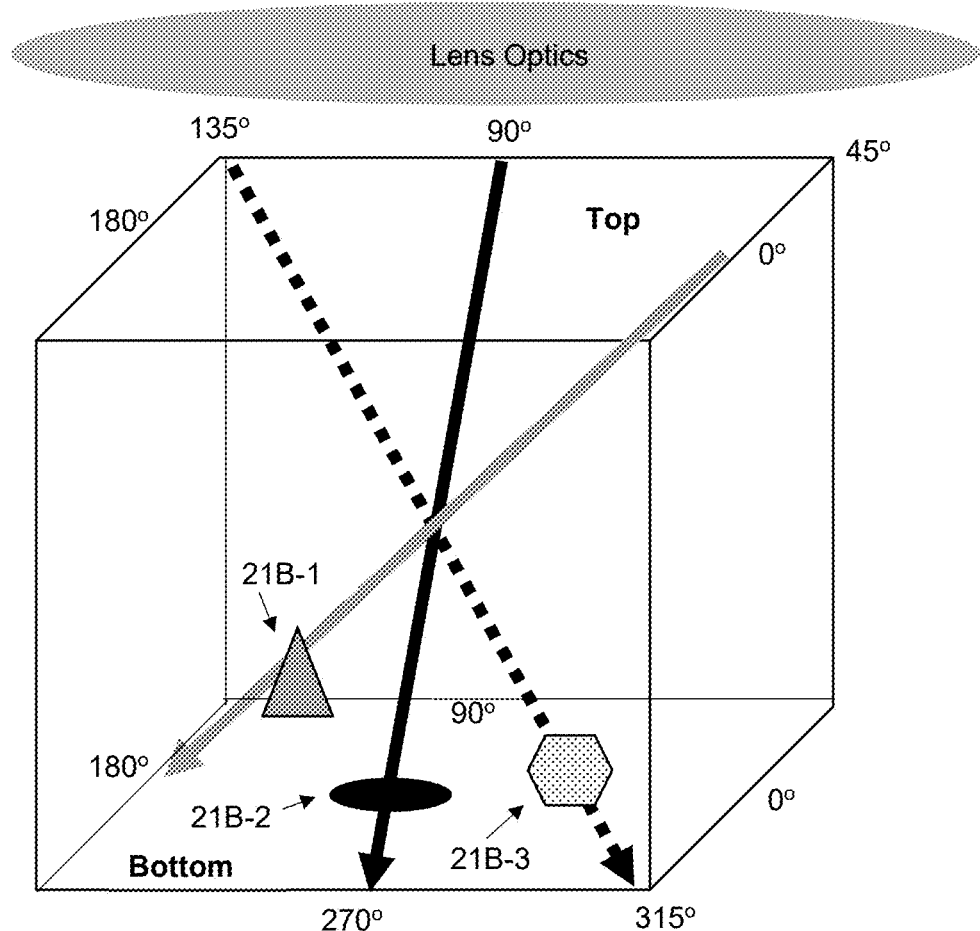
FIG. 21B illustrates how projected patterns move along projected vectors as a function of focus height.
Figure 21C:
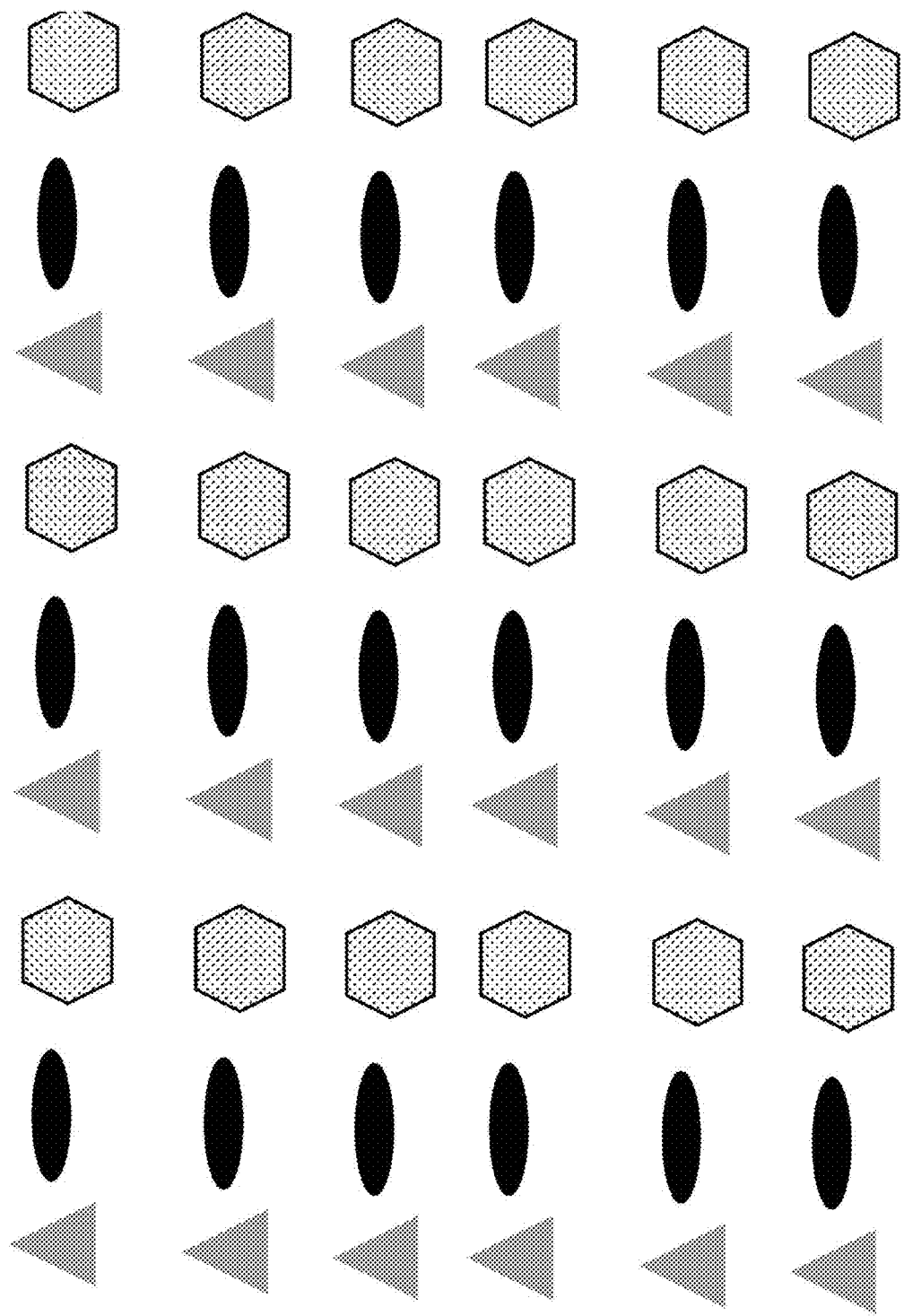
FIG. 21C illustrates three patterns projected onto a part.

FIGS. 21A through 23B are used to describe another method for determining the precise location of a projected shape on the focus camera. This method does not use slice measurements. FIG. 21B shows three shapes, a triangle at 21B-1, an oval at 21B-2, and an octagon at 21B-3 projected onto a part at different wavelengths, and from different angles and vector directions. FIG. 21A shows the direction of shape motion on focus camera 21A-4, relative to shape position and height on the part. When the part moves down, triangle 21A-1 on the camera moves to the left, oval 21A-2 moves down, and octagon 21A-3 moves along a diagonal down and to the right. When the part moves up, triangle 21A-1 moves to the right on the camera, oval 21A-2 moves up, and octagon 21A-3 moves along a diagonal up and to the left. A first pattern of repeating triangles, a second pattern of repeating ovals, and a third pattern of repeating octagons is projected onto the part in FIG. 21C at the vector angles and vector directions indicated in FIG. 21B. Each shape moves on the focus camera as indicated in FIG. 21A.

Figure 22A:
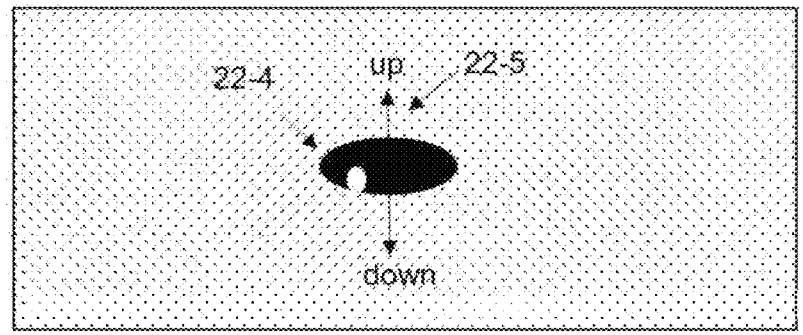
FIGS. 22A and 22B are another illustration showing how a projected pattern moves on the focus camera as a function of focus height.
Figure 22B:
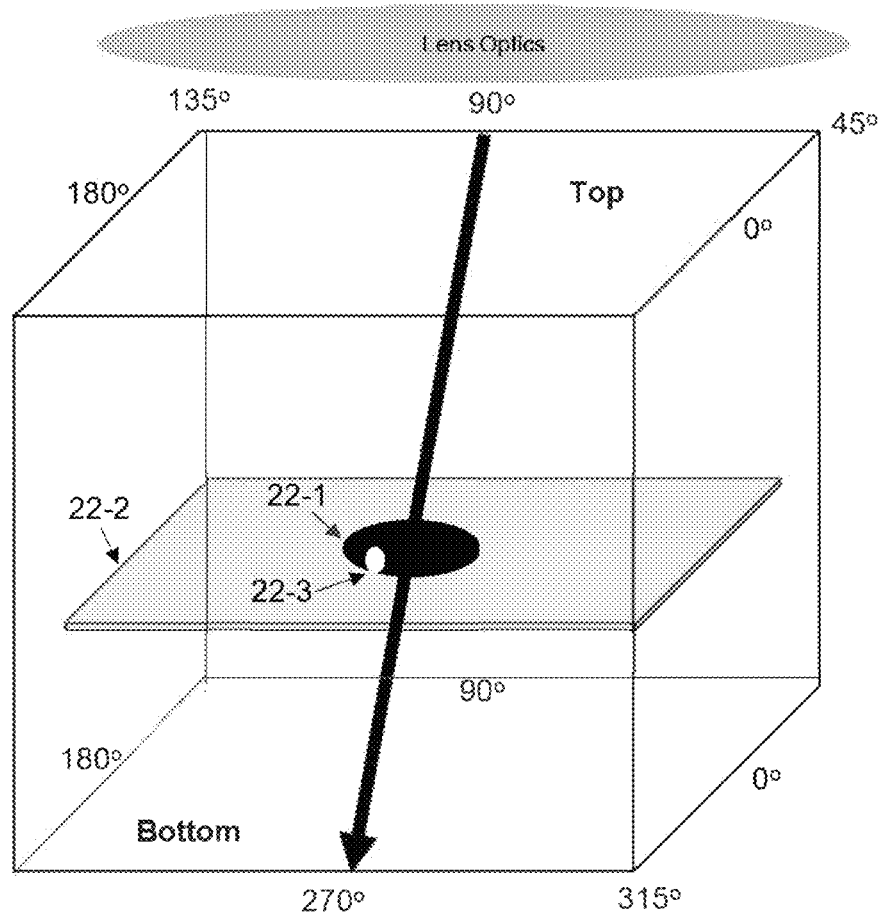

FIGS. 22A and 22B show black oval 21-1 projected onto part 22-2. White notch 22-3 represents a non-reflective region on the part. This could be due to a dark region in the metal or a section of missing metal. Regardless of its origin, this white notch 22-3 represents a change in the shape projected onto the part. The altered shape is shown at 22-4 on the focus camera. It moves up and down on the surface of the camera as a function of part height, as indicated by arrow 22-5. To calculate focus height, the precise location of the shape on the camera must be determined whether altered or not.

Figure 23A:
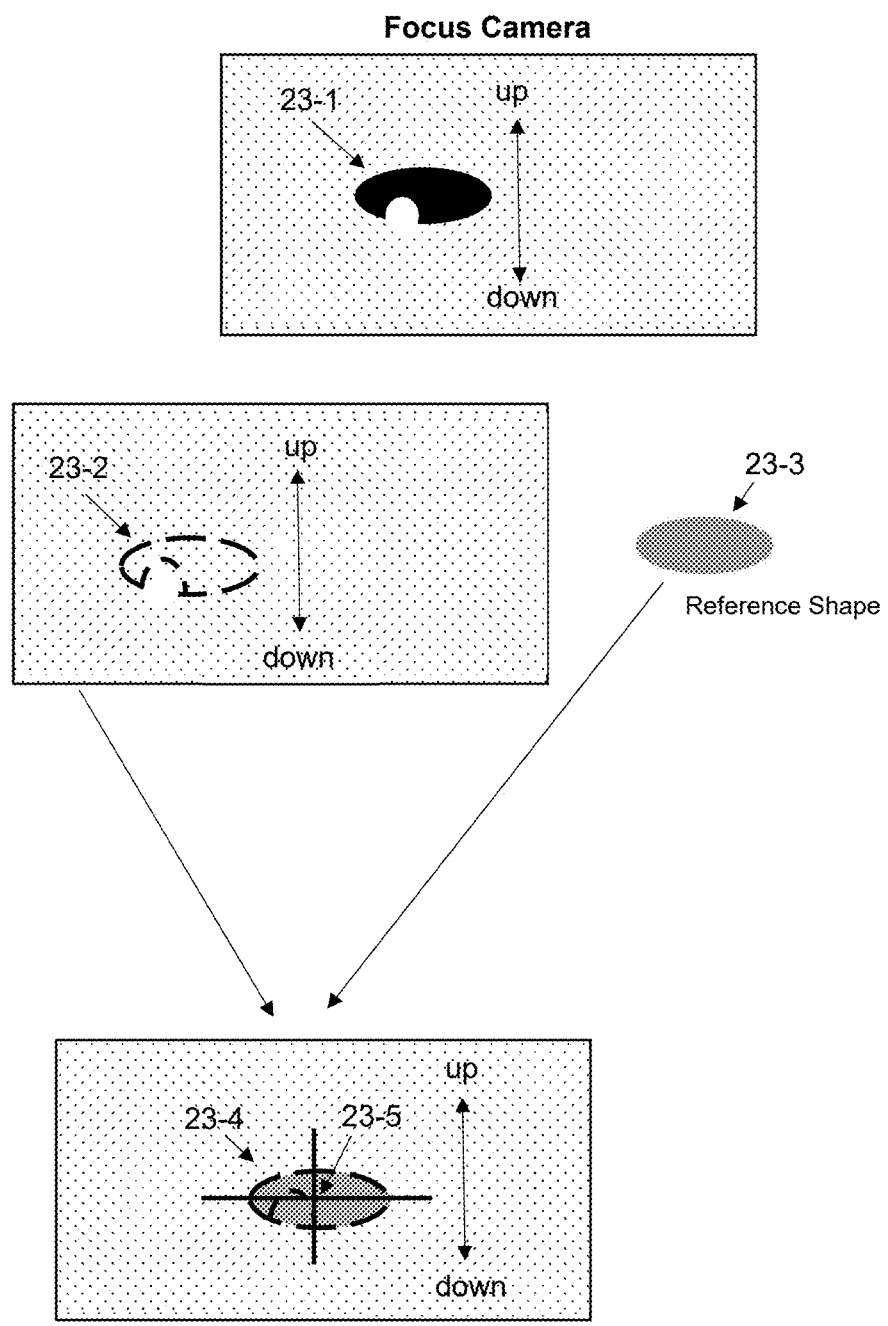
FIG. 23A shows how to fit a reference shape to an altered shape on the focus camera.
Figure 23B:
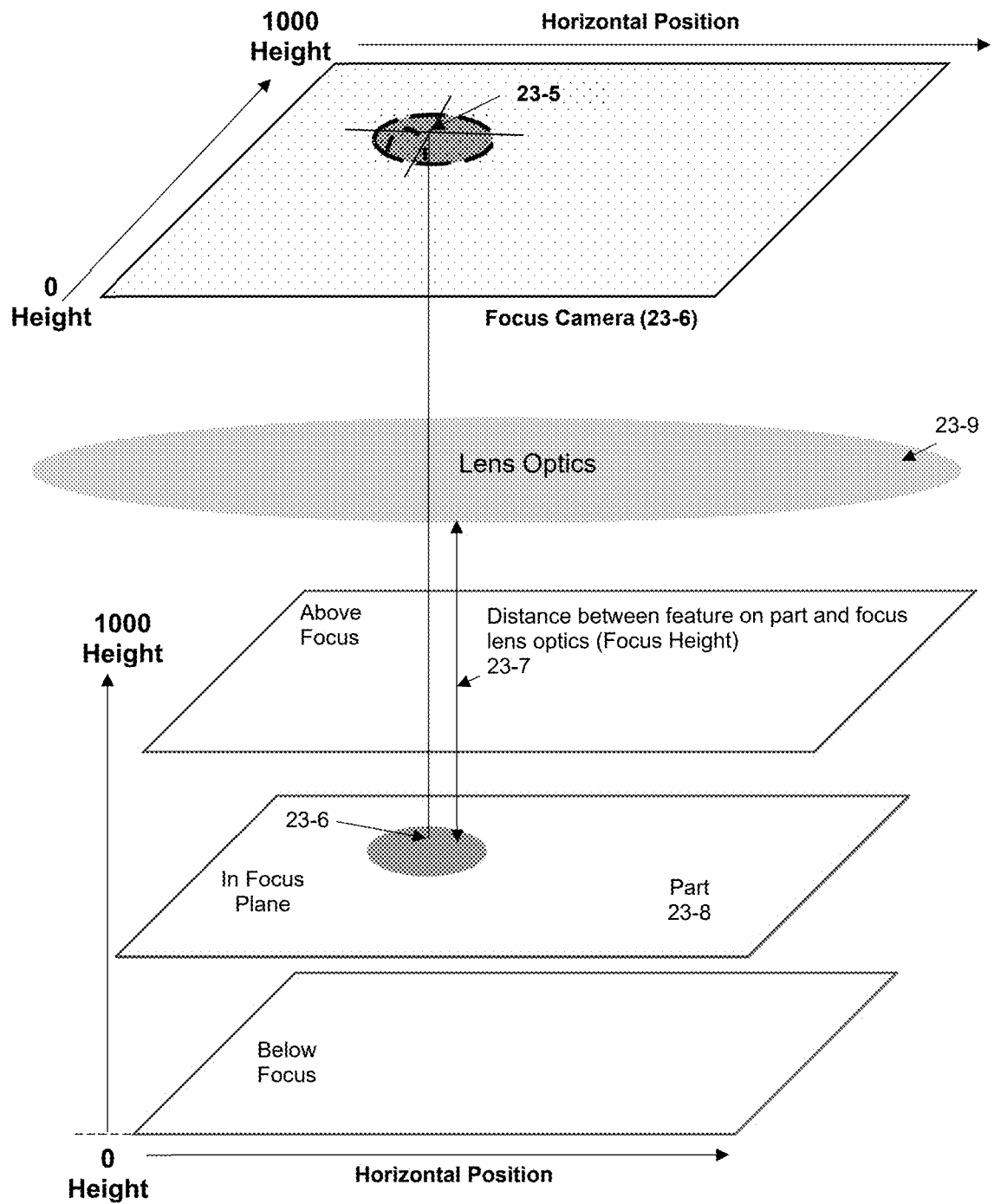
FIG. 23B shows how the position of the fitted shape is used to compute the distance between a part and the focus lens optics (focus height)
Figure 24B:
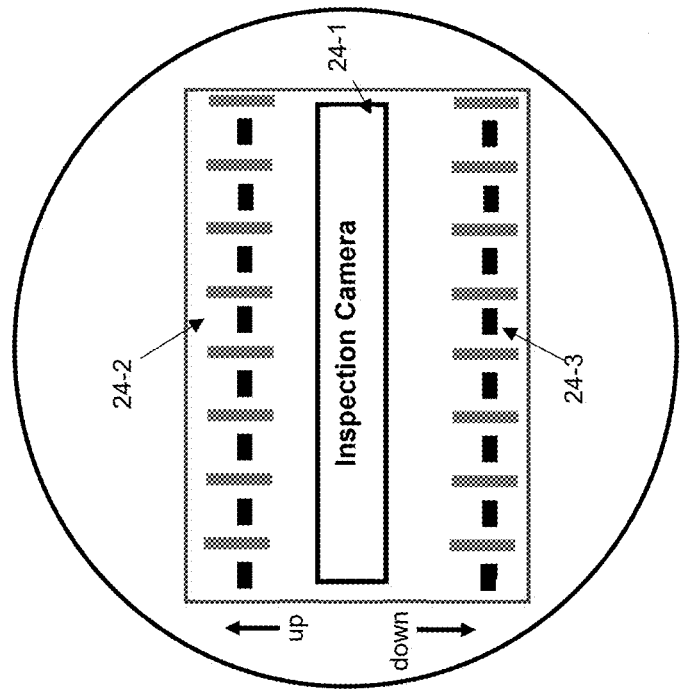
FIG. 24B shows two projected focus patterns for opposite directions of scan.
Figure 24A:
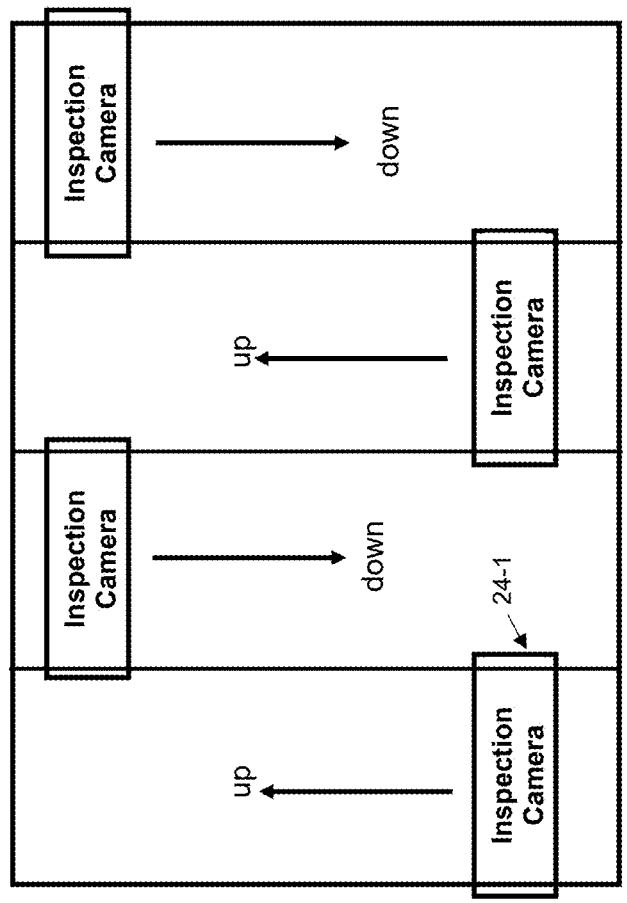
FIG. 24A shows an inspection camera scan pattern.
Figure 25:
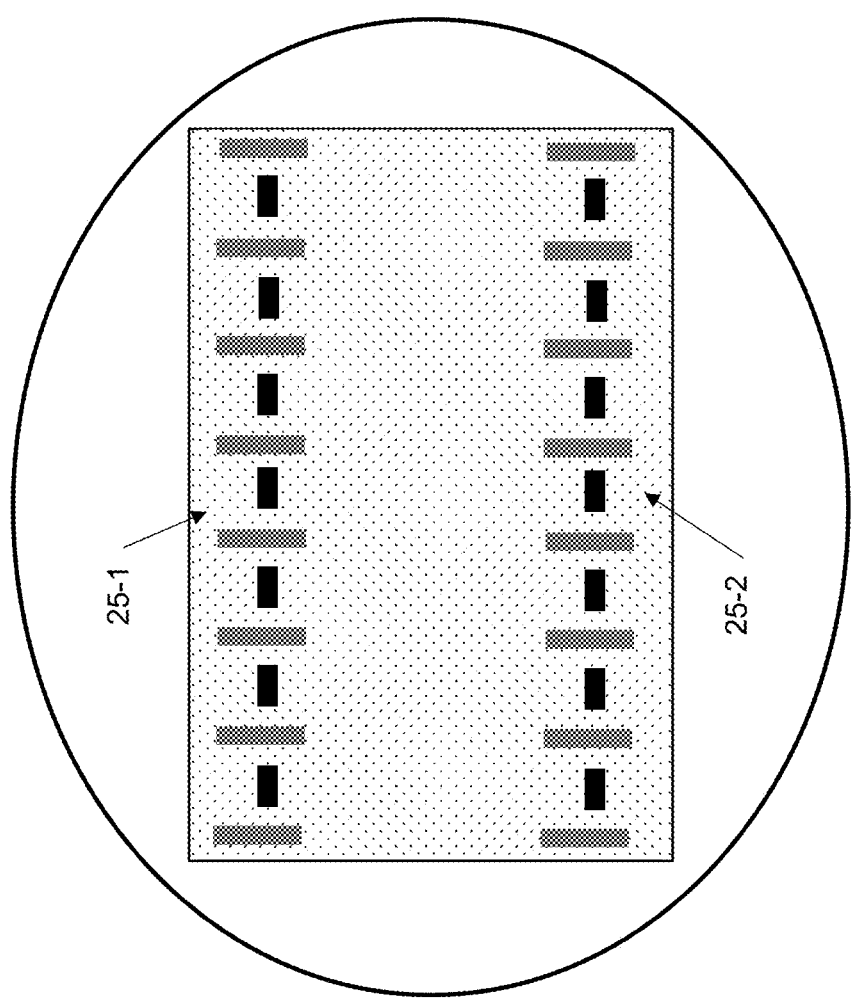
FIG. 25 shows two patterns on focus camera for scanning in opposite directions.

FIG. 23A is used to describe how this is accomplished. The altered shape is shown on the focus camera at 23-1. In this example, edge pixels of the shape are extracted as shown at 23-2. The known projected reference shape, shown at 23-3, is best fit to the extracted edge pixels of 23-2. This best fit position is shown at 23-4, and the center of this position, indicated by arrow 23-5, can be used to determine focus height. FIG. 23B is a three-dimensional illustration showing the center of the shape at 23-5, its corresponding location on the part at 23-6 and the calculated distance between the part and focus camera optics (focus height) at 23-7. As stated previously, the focus system described herein was developed to keep parts in focus, and specifically high-density electronic parts such as wafers and substrates, as they are inspected in real time. This novel approach can be incorporated with inspection systems such as the one described in U.S. Pat. No. 10,475,179, by Bishop et. al. (incorporated by reference herein) which scans an electronic part with a camera to measure the size of every feature and trace on the part to sub-micron, sub-camera pixel accuracy, independent of feature and trace orientation. In FIG. 24A, inspection camera 24-1 scans adjacent strips of a part, changing direction at the end of each strip. To keep the part in focus, a pattern of shapes is projected ahead of the inspection camera (24-1) as shown in FIG. 24B. Line pattern 24-2 is used to maintain focus as the inspection camera scans in the upward direction and pattern 24-3 is used to maintain focus in the downward scan direction. FIG. 25 shows the two projected line patterns 25-1 and 25-2 viewed by a focus camera and FIG. 26A shows how the shapes in each pattern change location on the camera when the part is below focus at 26-1, in focus at 26-2, and above focus at 26-3.

FIG. 26B is an example plotting the height of a part as it is being scanned. The part starts being below focus at 26-4, then in focus at 26-5, then above focus at 26-6.

Since the focus camera and part are moving relative to each other during the scan, each focus pattern in FIG. 26A represents the average height of the part during the frame rate integration time (Int) of the focus camera. FIG. 26B contains seven integration periods (Int1, Int2, . . . . Int7). Rather than averaging the heights, the light source for the focus patterns can be strobed during the scan to measure focus height at precise locations. This is illustrated by the seven marker points labeled strobe 1 through strobe 7 in FIG. 26B.

Figure 27:
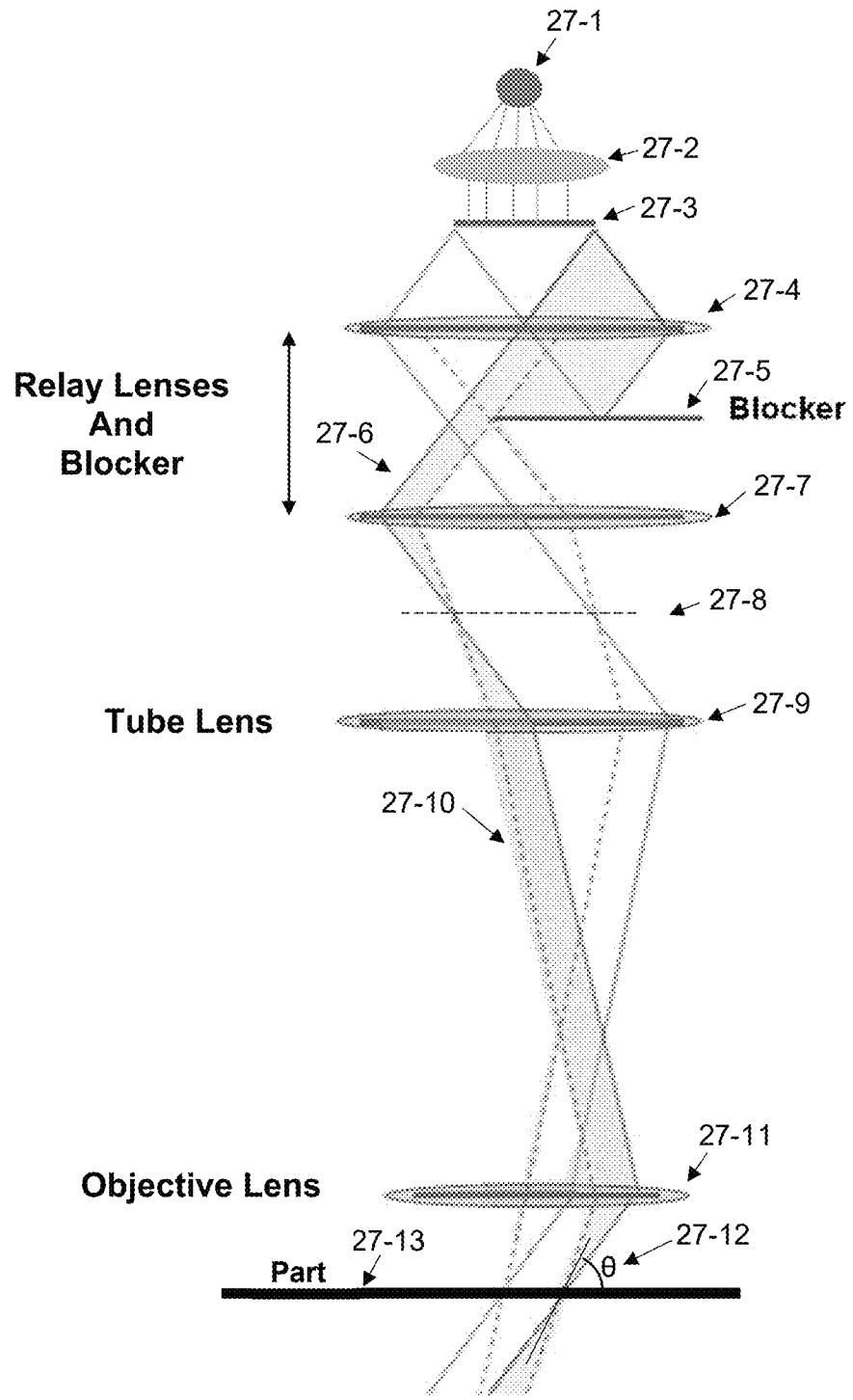
FIG. 27 is a ray diagram showing how to project a focus pattern onto a part.

Inherent to the embodiments disclosed herein, and in every example given, is the ability to project patterns at different wavelengths and from different angles and vector directions. FIG. 27 is an example showing how this can be accomplished. A pattern of shapes at 27-3 is illuminated at a wavelength 1 by illumination source 27-1 columnated through condenser optics 27-2. The pattern of shapes is placed at the focal distance of lens 27-4 to produce parallel rays between lens 27-4 and 27-7. Blocker 27-5 is inserted between the two lenses, 27-4 and 27-7, to only allow rays from one side of lens 27-4 to pass through the remaining optics. This causes the pattern projected onto the part at 27-13 to move horizontally in the plane of the part, as the part changes height. Rotating the blocker, while keeping it parallel to lenses 27-4 and 27-7, changes the vector position from which the focus pattern is projected onto the part (as an example: from the top surface at 0°, 90°, 135° see FIG. 21B). Rays 27-6, that pass the blocker, are focused by lens 27-7 to form an image of the pattern at 27-8. This image is placed at the focal distance of tube lens 27-9, is converted into parallel rays 27-10 and then re-imaged onto part 27-13 by objective lens 27-11. The angle of the rays θ, projected onto part 27-13 is indicated by arrow 27-12.

Figure 28:
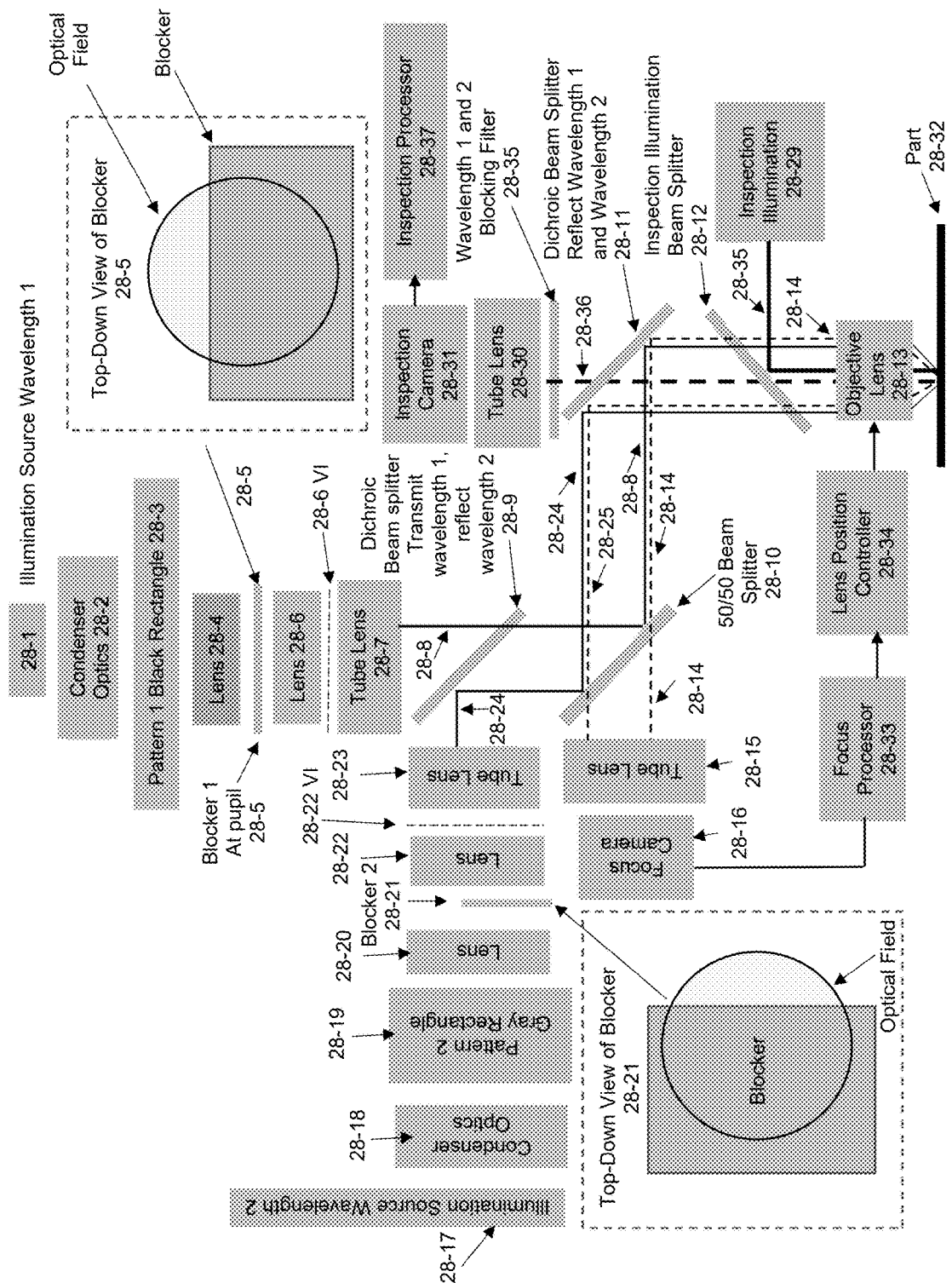
FIG. 28 is a block diagram of an integrated focus and inspection system with two focus patterns.
Figure 29A:
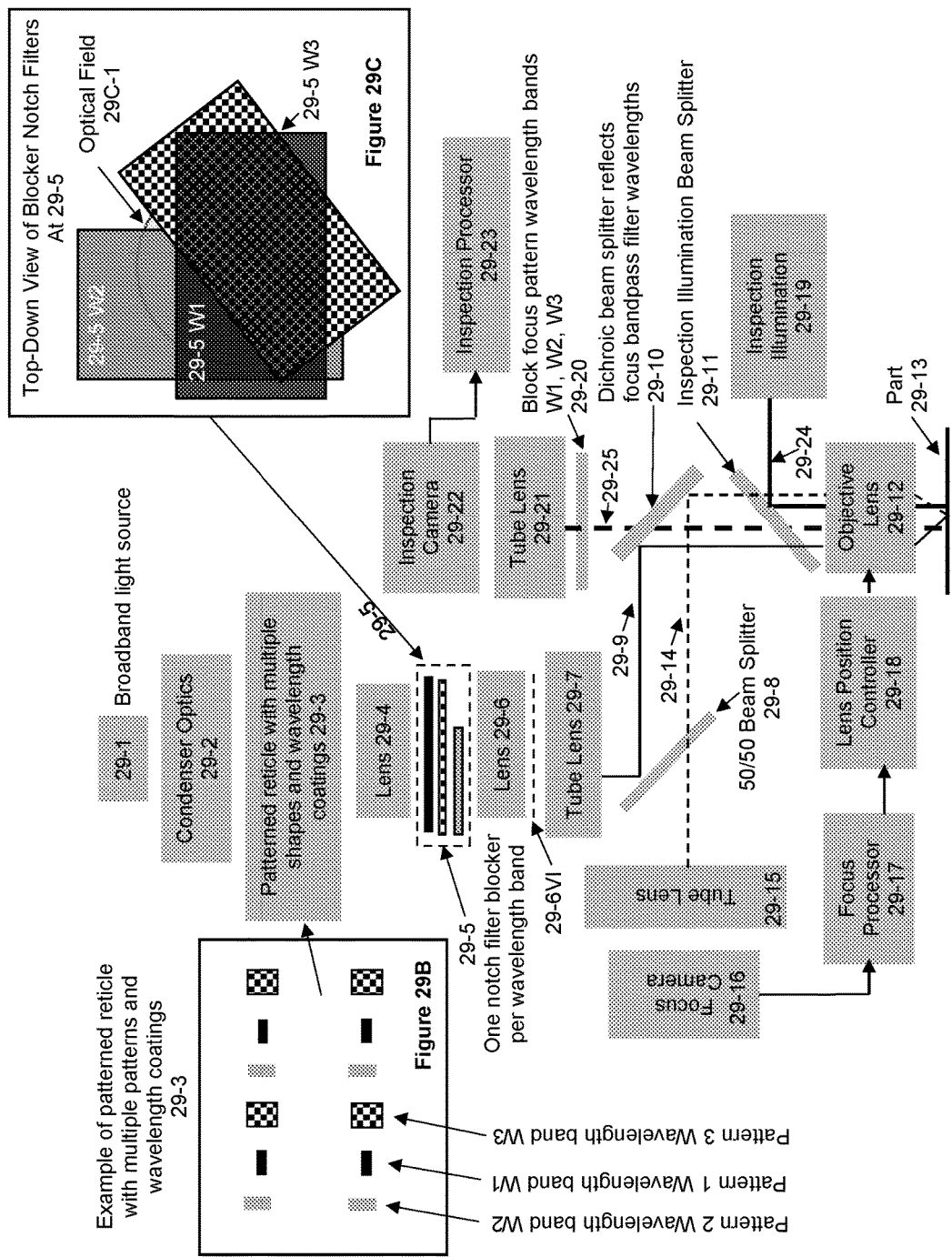
FIGS. 29A, 29B and 29C are a block diagram of an integrated focus and inspection system with three focus patterns.
Figure 29B:
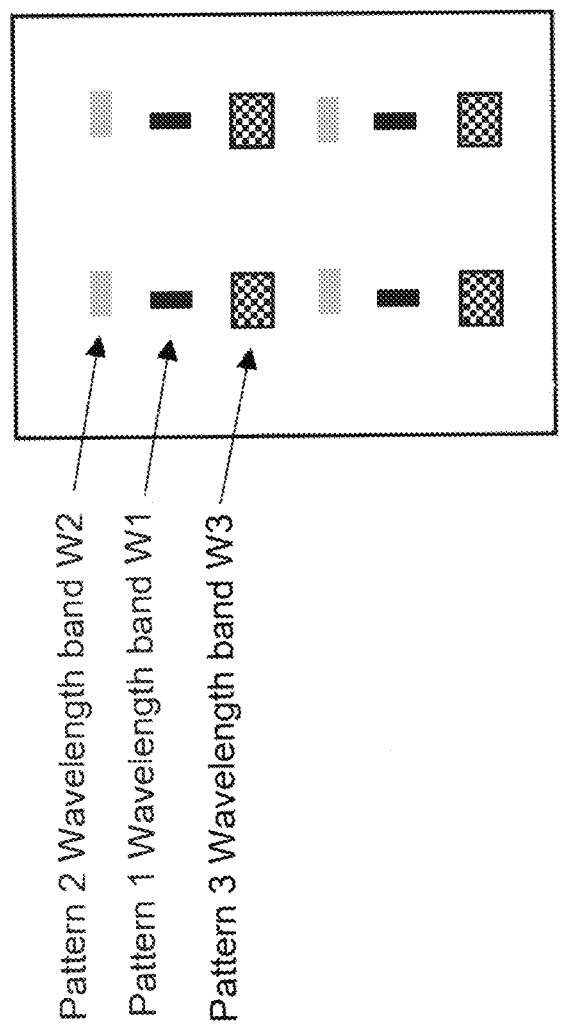
Figure 29C:
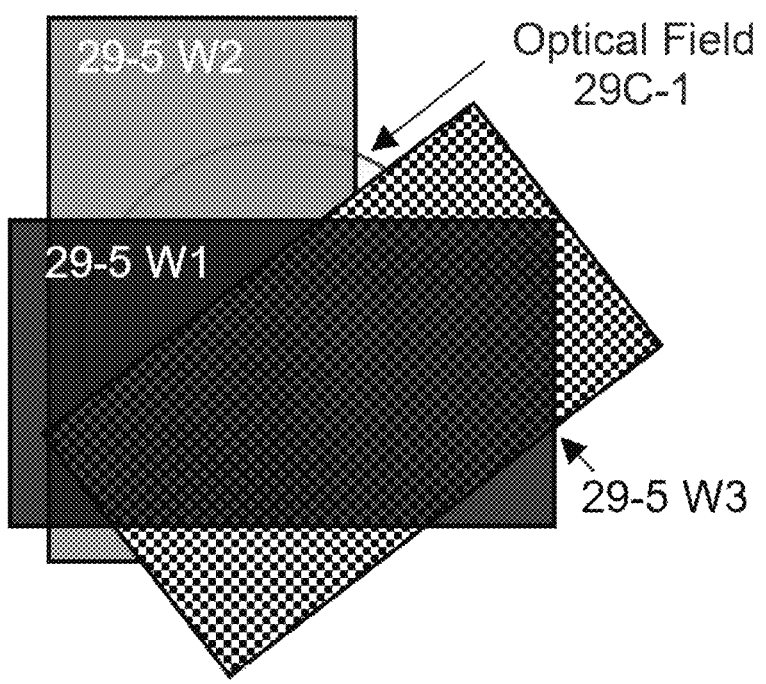

While there are other implementations known to those in the art to project such patterns onto a part, the implementation shown in FIG. 27 is advantageous in that it can be readily integrated into a real time inspection system, such as the one described in U.S. Pat. No. 10,475,179. FIGS. 28 and 29 are examples of such integrated systems. The block diagram of FIG. 28 projects two different patterns onto a part and the block diagram of FIG. 29C projects three patterns onto a part. Both FIGS. 28 and 29C show how the focus system is integrated with an inspection system camera of the type shown in FIG. 24A at 24-1.

In FIG. 28, illumination source 28-1 emits light at a wavelength 1 which is collimated by condenser lens 28-2. The collimated light illuminates a first pattern of shapes, pattern 1 at 28-3, which, for example, can be placed on a chrome glass plate or etched in a metal screen. Pattern 1 is placed at the focal distance of lens 28-4, such that the rays between lenses 28-4 and 28-6 are parallel. Blocker 28-5 is inserted between the two lenses, 28-4 and 28-6, to only allow rays from the top half of lens 28-4 to pass through the remaining optics. This causes pattern 1 projected onto the part at 28-32 to move in the plane of the part from the back to the front as the part changes height. This is illustrated in FIG. 11A with the back-and-forth direction of motion indicated by arrow 11-5. Lens 28-6 focuses the parallel rays to create a virtual image of the pattern at position 28-6 VI. This virtual image is located at the focal distance of tube lens 28-7 such that rays 28-8, leaving lens 28-7 are parallel. Parallel rays 28-8 travel through dichroic beam splitter 28-9, reflect off 50/50 beam splitter 28-10, reflect off dichroic beam splitter 28-11, pass through beam splitter 28-12 and enter objective lens 28-13. Lens 28-13 projects this first pattern onto part 28-32.

Rays reflecting and scattering off part 28-32 from pattern 1 pass back through objective lens 28-13 and emerge as parallel rays 28-14. Rays 28-14 pass through beam splitter 28-12, reflect off dichroic beam splitter 28-11, pass through beam splitter 28-10 and are focused by tube lens 28-15 to create an image of pattern 1 on focus camera 28-16.

The second focus pattern, pattern 2 at wavelength 2, originates at illumination source 28-17. Light from 28-17 passes through collimating lens 28-18 to uniformly illuminate pattern 2 at 28-19. Relay lens combination 28-20 and 28-22 creates parallel rays between the two lenses and produces a virtual image of pattern 2 at location 28-22VI. Blocker 2 located at 28-21, in the parallel ray path between lenses 28-20 and 28-22, only allow parallel rays from the right half of lens 28-20 to pass through the remaining optics. This causes pattern 2 projected onto the part at 28-32 to move left and right in the plane of the part as the part changes height. This is illustrated in FIG. 12A with the left to right direction of motion indicated by arrow 12-5. The virtual image of pattern 2 at 28-21VI is converted into parallel ray bundle 28-24 by tube lens 28-23. Parallel rays 28-24 reflect of dichroic beam splitter 28-9, reflect off 50/50 beam splitter 28-10, reflect of dichroic beam splitter 28-11, pass through inspection beam splitter 28-12 and enter objective lens 28-13. Lens 28-13 projects this second pattern, pattern 2, onto part 28-32.

Rays reflecting and scattering off part 28-32 from pattern 2 pass back through objective lens 28-13 and emerge as parallel rays 28-25. Rays 28-25 pass through beam splitter 28-12, reflect off dichroic beam splitter 28-11, pass through beam splitter 28-10 and are focused by tube lens 28-15 to create an image of pattern 2 on focus camera 28-16.

The position of the shapes on the focus camera, resulting from projecting patterns 1 and 2 onto the part, are analyzed by focus processor 28-33, using the algorithms previously described and illustrated in FIGS. 11A through 17. Shape positions, slice locations, centroid values and focus height parameters are calculated by focus processor 28-33 and used to adjust the distance between the part 28-32 and objective lens 28-13 to keep the part in focus as the part is being inspected. Distance between objective lens 28-13 and part 28-32 is adjusted through controller 28-34 which moves the objective lens in response to commands issued by focus processor 28-33.

An inspection path consisting of inspection camera 28-31, tube lens 28-30, and inspection illuminator 28-29, are added to this block diagram to integrate the focus system into an inspection system. The inspection path operates at wavelengths different from focus pattern wavelengths 1 and 2. To separate the inspection camera path from the focus camera path, based on wavelength, dichroic beam splitter 28-11, and blocking filter 28-35 ensures that only the inspection wavelengths reach inspection camera 28-31 and only the focus pattern wavelengths 1 and 2 reach focus camera 28-16.

To inspect a part, illuminator 28-29 reflects light, within a predetermined range of wavelengths (wavelengths 3) onto dichroic beam splitter 28-12 and into objective lens 28-13. This path is indicated by arrow 28-35. Light reflected or scattered off part 28-32, within the wavelength 3 band, returns through lens 28-13, passes through beam splitter 28-12, passes through dichroic beam splitter 28-11, passes through blocking filter 28-35 and is imaged onto inspection camera 28-31 by tube lens 28-30. This path is indicated by arrow 28-36. Inspection camera 28-31 is connected to inspection processor 28-37 that inspects the part for defects and/or performs measurements.

As an example, inspection processor 28-31 may be of the type described in U.S. Pat. No. 10,475,179 incorporated by reference herein. Inspection camera 28-31 may be a model VT-9K7X-H250 manufactured by Vieworks Co., Ltd. Focus camera 28-16 may be a Falcon2 FA-80-4M180 manufactured by Teledyne Dalsa. Focus processor 28-33 can be implemented using a Proc EIII processor, manufactured by GiDEL Ltd., and Lens position controller 28-34 may be a model Pifoc manufactured by PI (Physik Instrumente) L.P.

The block diagram of FIG. 28 projected two different patterns onto a part. FIG. 29A is a block diagram illustrating how more than two patterns can be projected onto a part and also illustrates how an inspection camera can be integrated into this multi pattern focus system.

In FIG. 29A, light from broadband illumination source 29-1 passes through condenser lens 29-2 to uniformly illuminate patterned reticle 29-2. The reticle contains multiple patterns with different shapes. Each different pattern is coated with a different wavelength coating that only allows wavelengths within a certain range or band to pass. FIG. 29B is an example of a reticle with three different patterns, each with a different wavelength band coating, a black horizontal rectangle (pattern 1, wavelength band W1), a gray vertical rectangle (pattern 2 wavelength band W2), and a checkered square (pattern 3 wavelength band W3). Reticle 29-3, containing all these patterns, is placed at the focal point of lens 29-4 to produce parallel rays between lens 29-4 and 29-6. Multiple wavelength blockers are placed between lenses 29-4 and 29-6 to enable each pattern to be projected onto the part from a different vector angle and orientation. Each blocker is composed of an optical coating that only prevents wavelengths within a certain band from passing. Wavelengths outside this band pass directly through the blocker. As an example, FIG. 29C contains three blockers stacked on top of each other, with each blocker positioned at a different angular orientation. Blocker 29-5 W1, in FIG. 29C, only prevents wavelengths within band W1 from passing and only blocks the bottom section of the optical field (29C-1). Since blockers 29-5W2 and 29W3, stacked below blocker 29-5 W1 in FIG. 29C, only blocks wavelength bands W2 and W3 respectively, and passes all other wavelengths, wavelength band W1 passes through them as though they were not even there. This results in black rectangle pattern 1, wavelength band W1, being projected from the top half of the optical field (29C-1) so the pattern of black rectangles moves up and down on the focus camera as the part changes height, as illustrated in FIG. 20A at 20-3. Blocker 29-5 W2 in FIG. 29C is oriented so that it only blocks gray rectangle pattern 2, wavelength band 2, on the left half of the optical field. This results in gray rectangle pattern 2, wavelength band W2, being projected from the right half of the optical field (29C-1) so the pattern of gray rectangles moves left and right on the focus camera as the part changes height, as illustrated in FIG. 20A at 20-2. Since blockers 29-5 W1 and 29-5 W3, stacked above blocker 29-5 W2 in FIG. 29C, only blocks wavelength bands W1 and W3 respectively, and passes all other wavelengths, wavelength band W2 passes through them as though they were not even there. Likewise, Blocker 29-5 W3 in FIG. 29C is oriented so that it only blocks checkered rectangle pattern 3, wavelength band 3, in the lower right section of the optical field. This results in checkered rectangle pattern 3, wavelength band W3, being projected from the upper left corner of the optical field (29C-1) so the pattern of checkered rectangles moves along a diagonal on the focus camera as the part changes height, as illustrated in FIG. 20A at 20-4. Since blockers 29-5W1 and 29-5 W2, stacked above and below blocker 29-5 W3 in FIG. 29C, only blocks wavelength bands W1 and W2 respectively, and passes all other wavelengths, wavelength band W3 passes through them as though they were not even there.

The three parallel rays, containing wavelength bands W1, W2, W3, are focused by lens 29-6 to form a virtual image at position 29-6VI, located at the focal point of tube lens 29-7. Tube lens 29-7 converts the rays into parallel beam 29-9 that reflects off beam splitter 29-8, reflects of dichroic beam splitter 29-10, passes through beam splitter 29-11 and enters objective lens 29-12. Objective lens 29-12 focuses ray 29-9 into an image of the reticle pattern at part 29-13. This image is reflected and scattered off part 29-13 back into objective lens 29-12 which converts the image into parallel rays 29-14. These parallel rays travel through beam splitter 29-11, are reflected off dichroic beam splitter 29-10, pass through beam splitter 29-8 and are then focused onto focus camera 29-16 by tube lens 29-15. The pattern on focus camera 29-16 is analyzed by focus processor 29-17 which sends commands to lens position controller 29-18 to move objective lens 29-12 to keep the part in focus as the part is being inspected for defects.

To inspect a part for defects or perform measurements an inspection path is added. Illuminator 29-19 reflects light, within a predetermined range or band of wavelengths (wavelength band 4) onto dichroic beam splitter 29-11 and into objective lens 29-12. This path is indicated by arrow 29-24. Light reflected or scattered off part 29-13, within the wavelength 4 band, returns through lens 29-12 passes through beam splitter 29-11, passes through dichroic beam splitter 29-10, passes through blocking filter 29-20 and is imaged onto inspection camera 29-22 by tube lens 29-21. This path is indicated by arrow 29-25. Inspection camera 29-22 is connected to inspection processor 29-23 that inspects the part for defects and or performs measurements.

As an example, inspection processor 29-23 may be of the type described in U.S. Pat. No. 10,475,179. Inspection camera 29-22 may be a model VT-9K7X-H250 manufactured by Vieworks Co. Ltd. Focus camera 29-16 may be a Falcon2 FA-80-4M180 manufactured by Teledyne Dalsa. Focus processor 29-17 can be implemented using a Proc EIII processor, manufactured by GiDEL Ltd., and Lens position controller 29-18 may be a model Pifoc manufactured by PI (Physik Instrumente) L.P.

The inspection path in both FIGS. 28 and 29A can be configured to inspect parts by reflecting or scattering light off the part or by fluorescing the part if the materials fluoresce. In either mode the inspection path operates in a different wavelength range than the autofocus path.

To reflect or scatter light off the part, 28-32 in FIG. 28, inspection illuminator beam splitter 28-12 reflects and passes the same, or a subset of, wavelengths emitted by illuminator 28-29.

Figure 30B:
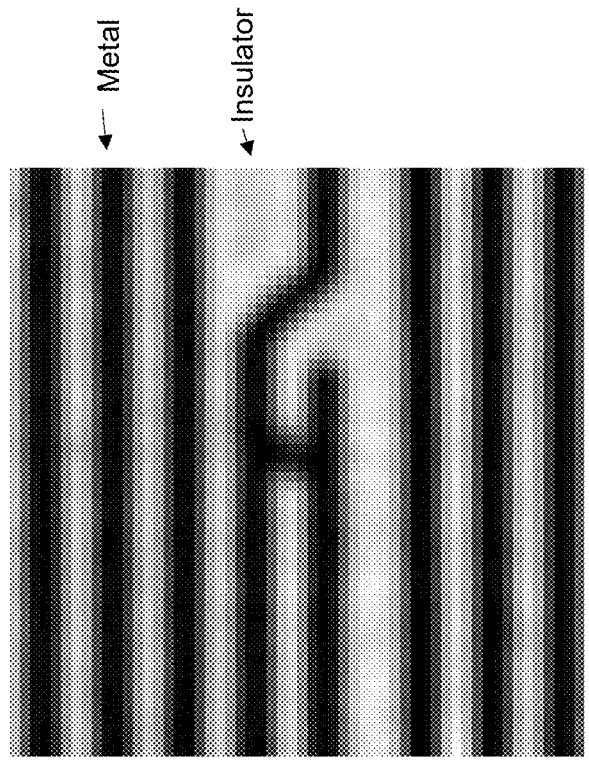
FIG. 30B is a fluorescent light image of electronic traces.
Figure 30A:
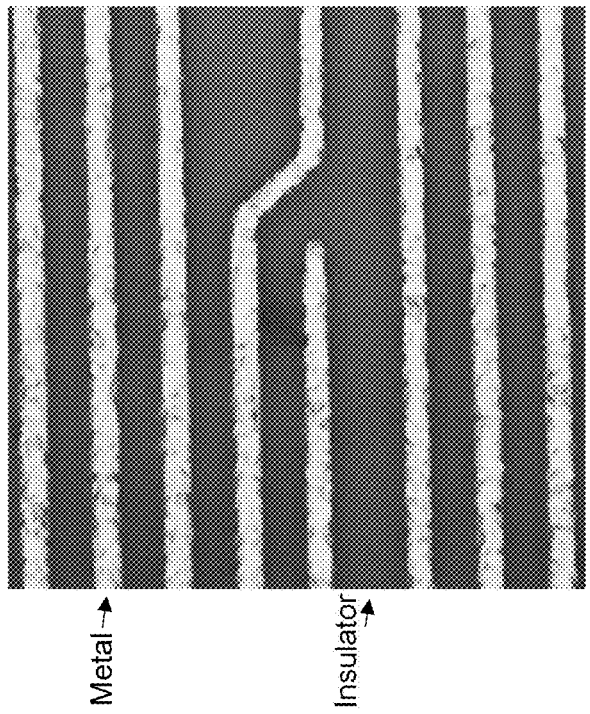
FIG. 30A is a white light image of electronic traces.

Dichroic beam splitter 28-11 and blocking filter 28-35 pass to camera 28-31 the same or a subset of the wavelengths emitted by illuminator 28-9. Dichroic beam splitter 28-11 reflects wavelengths 1 and 2, used to focus the part, toward focus camera 28-16 via beam splitter 28-10 and tube lens 28-15. FIG. 30A shows a white light image projected onto inspection camera 28-31.

To inspect a part 28-32 in FIG. 28, using fluorescence, inspection illuminator 28-29 must emit an excitation wavelength (wavelength EX) that causes the part to fluoresce. Beam splitter 28-12 in FIG. 28 must be a dichroic beam splitter that reflects excitation wavelength EX toward part 28-32 via objective lens 28-13. The fluorescent excitation path is represented by ray 28-35. In response to excitation wavelength EX, part 28-32 fluoresces at a wavelengths FL, different from the excitation wavelength EX and focus path wavelengths 1 and 2. These fluorescent rays are collected by objective lens 28-13 and converted into parallel fluorescent rays shown as path 28-36. Fluorescent rays at wavelengths FL pass through dichroic beam splitter 28-12, pass through dichroic beam splitter 28-11, pass through blocking filter 28-35 and are imaged onto inspection camera 28-31 by tube lens 28-30. Dichroic beam splitter 28-12 passes both wavelengths FL and focus wavelengths 1 and 2. Dichroic beam splitter 28-11 passes wavelengths FL toward inspection camera 28-31, via filter 28-35 and tube lens 28-30, and reflects focus pattern wavelengths 1 and 2 toward focus camera 28-16 via beam splitter 28-10 and tube lens 28-15. FIG. 30B shows a fluorescent image projected onto inspection camera 28-31. In the fluorescent image, metal does not fluoresce and appears dark, and the organic insulator does fluoresce and appears bright.

The inspection path in FIG. 29A can also be configured to inspect parts by reflecting or scattering light off the part or by fluorescing the part if the materials fluoresce. In either mode the inspection path operates in a different wavelength range than the autofocus path.

To reflect or scatter light off the part, 29-13 in FIG. 29A, inspection illumination beam splitter 29-11 reflects and passes the same, or a subset of, wavelengths emitted by illuminator 29-19. Dichroic beam splitter 29-10 and blocking filter 29-20 pass to camera 29-22 the same or a subset of the wavelengths emitted by illuminator 29-19. Dichroic beam splitter 29-10 reflects wavelengths 1 and 2, used to focus the part, toward focus camera 29-16 via beam splitter 29-8 and tube lens 29-15. FIG. 30A shows a white light image projected onto inspection camera 29-16.

To inspect a part, 29-13 in FIG. 29A, using fluorescence, inspection illuminator 29-19 must emit an excitation wavelength (wavelength EX) that causes the part to fluoresce. Beam splitter 29-11 in FIG. 29 must be a dichroic beam splitter that reflects excitation wavelength EX toward part 29-13 via objective lens 29-12. The fluorescent excitation path is represented by ray 29-24. In response to excitation wavelength EX, part 29-13 fluoresces at a wavelengths FL, different from the excitation wavelength EX and focus path wavelengths 1 and 2. These fluorescent rays are collected by objective lens 29-12 and converted into parallel fluorescent rays shown as path 29-25. Fluorescent rays at wavelengths FL pass through dichroic beam splitter 29-11, pass through dichroic beam splitter 29-10, pass through blocking filter 29-20 and are imaged onto inspection camera 29-22 by tube lens 29-21. Dichroic beam splitter 29-11 passes both wavelengths FL and focus wavelengths 1 and 2. Dichroic beam splitter 29-10 passes wavelengths FL toward the inspection camera via filter 29-20 and tube lens 29-21 and reflects focus pattern wavelengths 1 and 2 toward focus camera 29-16 via beam splitter 29-8 and tube lens 29-15. FIG. 30B shows a fluorescent image projected onto inspection camera 29-22.

In the fluorescent image, metal does not fluoresce and appears dark, and the organic insulator does fluoresce and appears bright.

CONCLUSION

As will now be apparent, the focus system as disclosed herein meets the objectives of keeping a part in focus as it is being inspected independent of feature and trace orientation and density. It can be easily integrated into an inspection system and is applicable to keeping parts in focus with high aspect ratio structures and or parts with low or non-reflective insulators. It enables the inspection of high-density fine line products, requiring high resolution, high numerical aperture (NA) imaging optics with small depths of focus (DOF), that must be kept in focus as the part is inspected regardless of trace and feature orientation and density.

Moreover, the disclosed and other embodiments described herein can be implemented without departing from their spirit and scope while realizing any or all of the benefits. Therefore, it is the intent of the appended claims to cover all such variations as come within the true spirit and scope of this patent.

The invention claimed is:

1. A method of operating a focus system for use in inspection of a part such as a panel, substrate or wafer comprising:
   a) configuring a focus camera and an inspection camera to view the part (FIG. 28 at 28-16, 28-31, FIG. 29 at 29-16, 29-22),
   b) projecting two or more different known patterns onto the part (FIGS. 13A, 13B, 21B),
   c) each different known pattern being composed of multiple copies of a given, known,-geometric shape (FIG. 13A, 21C),
   d) each pattern projected at a different wavelength (FIG. 29B), vector angle and vector direction relative to a perpendicular drawn to optics of the focus camera (FIG. 13B, 21B),
   e) the projected pattern wavelengths being blocked by a corresponding filter so as not to appear on the inspection camera (FIG. 28 at 28-35, FIG. 29 at 29-20) and directed to a dichroic beam splitter configured to direct only the projected pattern wavelengths toward the focus camera (FIG. 28 at 28-11, FIG. 29 at 29-10),
   f) geometric shapes in each pattern moving on a surface of the focus camera as a function of projected vector angle, projected vector direction and/or changes in vertical height between features on the part and focus optics of the focus camera (FIG. 14A,14B,14C, 20A, 20B, 21A),
   h) for each projected shape:
      detecting that projected shape with a focus camera (FIGS. 14A, 14B, 14C, 21A, 22A);
      taking a measurement of at least one dimension of that projected shape;
      if the measurement of least one dimension of that projected shape matches a reference for that shape, then identifying the measurement as a valid measurement, (FIG. 15A, 15B, FIG. 23A, 23B)
      otherwise
      if a projected shape is not detected or the measurement does not match the reference for that shape, then identifying the measurement as an invalid measurement (FIG. 15),
   i) determining a position of each valid measurement of a projected shape (FIG. 17 at 17-1, 17-2, 17-3, 22A, 22B, and 26A at 26-1, 26-2, 26-3), and
   j) changing the distance between the part and focus camera optics, based on the position of the projected shape corresponding to the valid measurement, to thereby keep the part in focus within an optical depth of field across the optical field of view of the focus camera and inspection camera (FIG. 28 at 28-34 and 29 at 29-18).

2. The method of claim 1 further comprising:
   h) dividing one or more of the projected shapes on the surface of the focus camera into one or more slices (FIGS. 13 at 13-7 and 13-8),
   i) each slice oriented parallel to the vector angle and vector direction of motion of the projected shapes on the surface of the focus camera corresponding to a same direction of motion on the part (FIG. 20),
   j) measuring a width and signal intensity of the one or more slices on the focus camera (FIG. 15A),
   k) comparing each individual width and intensity measurement, above a minimum predetermined brightness intensity, to an expected width and intensity, and only if such measurement is within predetermined width tolerances then considering the measurement valid (FIG. 15B),
   l) The expected width corresponding to a reference width of a slice as expected for a fully reflected shape (FIG. 15A).

3. The method of claim 2 in which a centroid is computed from valid measurements and used to calculate the vertical height between the part and focus camera optics at the valid measurement location (FIG. 16).

4. The method of claim 2 in which the projected patterns are strobed (FIG. 26B).

Figure 10:
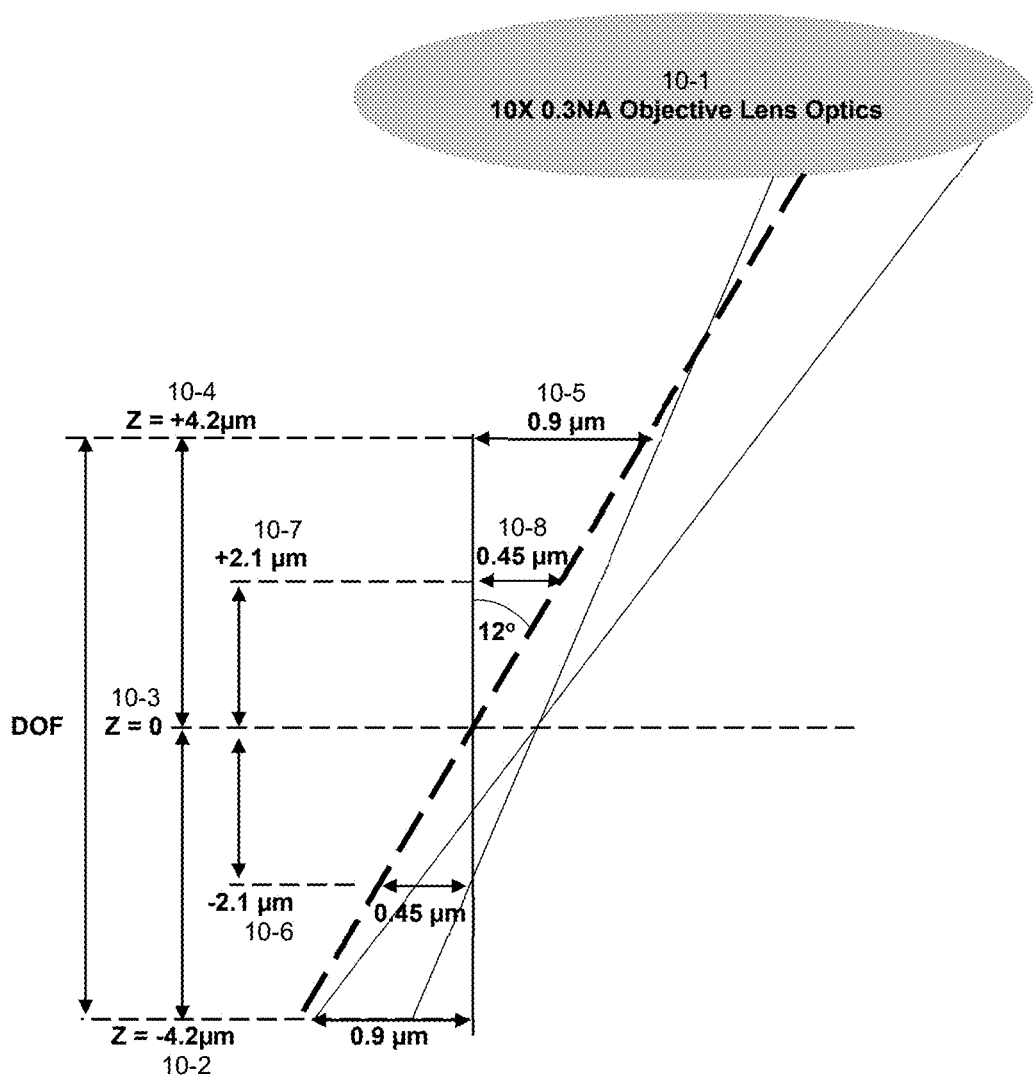
FIG. 10 is an illustration showing focus depth for high NA optics.

5. The method of claim 2 additionally comprising using high resolution, high numerical aperture (NA) imaging optics with small depths of focus (DOF) (FIG. 10).

6. The method of claim 1 further comprising:
   h) fitting a known good reference shape to edge points or perimeter points of one or more shapes on the surface of the focus camera to create best fit positions for each fitted set of edge or perimeter points (FIG. 23A),
   i) using these best fit positions to calculate a distance between the part and focus optics at corresponding locations on the part, and to calculate a height profile of the part (FIG. 23B).

7. The method of claim 6 in which the projected patterns are strobed (FIG. 26B).

8. The method of claim 6 further comprising using high resolution, high numerical aperture (NA) imaging optics with small depths of focus (DOF) (FIG. 10).

9. A system for inspecting a part that incorporates the focus method of claim 6 (FIG. 29).

10. A system for inspecting a part using fluorescence that incorporates the focus method of claim 6 (FIG. 30B).

11. A system for inspecting a part that incorporates the focus method of claim 1 (FIG. 28).

12. A system for inspecting a part using fluorescence that incorporates the focus method of claim 1 (FIG. 30B).

13. A method of operating a focus system for use in inspecting a part, the method comprising
   a) arranging the part (29-13) and optics (29-12) such that the part is within a field of view of a focus camera (29-16) and an inspection camera (29-22);
   b) projecting two or more known patterns onto the part, the two or more known patterns including at least two or more known projected shapes having different wavelengths (FIGS. 13A, 13B, 13C, 21C, 29B);

c) the optics configured to direct only the projected pattern wavelengths toward the focus camera and such that the projected pattern wavelengths are not directed to the inspection camera (FIG. 28 at 28-11, 28-35, FIG. 29 at 29-10, 29-20);

d) for each projected shape:
 i) detecting that projected shape with the focus camera (FIGS. 14A, 14B, 14C, 21A, 22A);
 ii) taking a measurement of at least one dimension of that projected shape;
 iii) if the measurement of least one dimension of that projected shape matches a reference for that shape, then identifying the measurement as a valid measurement (FIGS. 15A, 15B, 23A, 23B);
 iv) otherwise
 v) if a projected shape is not detected or the measurement does not match the reference for that shape, then identifying the measurement as an invalid measurement (FIGS. 15A, 15B, 23A, 23B);

e) determining positions of one or more of the projected shapes that correspond to one or more of the valid measurements (FIG. 17 at 17-1, 17-2-, 17-3, FIG. 26A at 26-1, 26-2, 26-3); and f) controlling the optics based on the valid measurements such that part remains in focus on both the focus camera and the inspection camera (FIG. 28 at 28-13, 28-34 and FIG. 29 at 29-12, 29-18).

14. The method of claim 13 wherein the position is a centroid of the reference shape.

15. The method of claim 13 wherein the reference is a dimension along one axis of the shape.

16. The method of claim 13 wherein taking the measurement includes taking two dimensional measurements and the reference is a two dimensional reference shape.

17. The method of claim 13 wherein the measurement is considered the be a valid measurement if the measurement matches the reference within a tolerance.

* * * * *